United States Patent
Tsunematsu et al.

(10) Patent No.: US 11,345,607 B2
(45) Date of Patent: May 31, 2022

(54) NEAR-INFRARED ABSORBING FINE PARTICLE DISPERSION LIQUID, NEAR-INFRARED ABSORBING FINE PARTICLE DISPERSION BODY, NEAR-INFRARED ABSORBING TRANSPARENT SUBSTRATE, NEAR-INFRARED ABSORBING LAMINATED TRANSPARENT SUBSTRATE

(71) Applicant: SUMITOMO METAL MINING CO., LTD., Tokyo (JP)

(72) Inventors: Hirofumi Tsunematsu, Isa (JP); Takeshi Chonan, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/321,174

(22) PCT Filed: May 31, 2017

(86) PCT No.: PCT/JP2017/020214
§ 371 (c)(1),
(2) Date: Jan. 28, 2019

(87) PCT Pub. No.: WO2018/020819
PCT Pub. Date: Feb. 1, 2018

(65) Prior Publication Data
US 2019/0161361 A1 May 30, 2019

(30) Foreign Application Priority Data

Jul. 26, 2016 (JP) .............................. JP2016-145860

(51) Int. Cl.
*C01G 15/00* (2006.01)
*C01G 19/02* (2006.01)
(Continued)

(52) U.S. Cl.
CPC .............. *C01G 41/02* (2013.01); *B32B 27/18* (2013.01); *C01G 15/00* (2013.01); *C01G 19/02* (2013.01);
(Continued)

(58) Field of Classification Search
CPC ........ C01G 15/00; C01G 19/02; C01G 41/02; C09D 5/32; C01P 2004/22; C01P 2006/60
See application file for complete search history.

(56) References Cited

U.S. PATENT DOCUMENTS

2010/0219654 A1   9/2010  Fujita
2014/0377567 A1*  12/2014 Ii ........................ B32B 17/10688
                                                         428/432
2017/0334735 A1*  11/2017 Machida ................ C09D 17/00

FOREIGN PATENT DOCUMENTS

JP        H02-136230 A     5/1990
JP        H08-259279 A    10/1996
(Continued)

OTHER PUBLICATIONS

Mar. 12, 2020 Extended Search Report issued in European Patent Application No. 17833830.7.
(Continued)

*Primary Examiner* — Bijan Ahvazi
(74) *Attorney, Agent, or Firm* — Oliff PLC

(57) ABSTRACT

There is provided a near-infrared absorbing fine particle dispersion liquid containing near-infrared absorbing fine particles, thereby as well as exhibiting near-infrared light absorption properties and suppressing a scorching sensation on the skin when used in structures such as window materials and the like, also enabling usage of communication devices, imaging devices, sensors and the like that employ near-infrared light through these structures, a near-infrared
(Continued)

absorbing film or a near-infrared absorbing glass, a dispersion body or a laminated transparent substrate, the dispersion liquid containing at least composite tungsten oxide fine particles and antimony doped tin oxide fine particles and/or tin doped indium oxide fine particles as near-infrared absorbing fine particles, wherein in the composite tungsten oxide fine particles, an average value of a transmittance in a wavelength range of 800 to 900 nm is 30% or more and 60% or less, and an average value of a transmittance in a wavelength range of 1200 to 1500 nm is 20% or less, and a transmittance at a wavelength of 2100 nm is 22% or less, when a visible light transmittance is 85% at the time of calculating only light absorption by the composite tungsten oxide fine particles, and containing mixed particles of the composite tungsten oxide fine particles and antimony-doped tin oxide fine particles and/or tin-doped indium oxide fine particles dispersed in a liquid medium, wherein the liquid medium is selected from rater, an organic solvent, an oil and fat, a liquid resin, a liquid plasticizer for plastics, or a mixture thereof, wherein when a visible light transmittance is adjusted to 85% at the time of calculating only light absorption by the near-infrared absorbing fine particles in the dispersion liquid by diluting with the liquid medium, an average value of a transmittance in the wavelength range of 800 to 900 nm is 30% or more and 60% or less, an average value of a transmittance in the wavelength range of 1200 to 1500 nm is 20% or less, and a transmittance at the wavelength of 2100 nm is 11% or less.

13 Claims, 1 Drawing Sheet

(51) Int. Cl.
  *C01G 41/02* (2006.01)
  *C09D 5/32* (2006.01)
  *G02B 5/22* (2006.01)
  *C09K 3/00* (2006.01)
  *B32B 27/18* (2006.01)
  *C08K 3/22* (2006.01)
  *C08L 101/00* (2006.01)
(52) U.S. Cl.
  CPC .............. *C08K 3/22* (2013.01); *C08L 101/00* (2013.01); *C09D 5/32* (2013.01); *C09K 3/00* (2013.01); *G02B 5/22* (2013.01); *C01P 2004/22* (2013.01); *C01P 2006/60* (2013.01)

(56) References Cited

FOREIGN PATENT DOCUMENTS

| JP | H11-181336 A | 7/1999 | |
|----|----|----|----|
| JP | 2005-226008 A | 8/2005 | |
| JP | 2010-228959 A | 10/2010 | |
| JP | 2010228959 A * | 10/2010 | ....... B32B 17/10633 |
| JP | 2011063741 A * | 3/2011 | ............ B32B 27/18 |
| JP | 5120661 B2 | 1/2013 | |
| JP | 2013173642 A * | 9/2013 | ............ C01G 41/00 |
| JP | 2016-088960 A | 5/2016 | |
| WO | 2005/037932 A1 | 4/2005 | |
| WO | 2009/054051 A1 | 4/2009 | |

OTHER PUBLICATIONS

Aug. 8, 2017 International Search Report issued in International Patent Application No. PCT/JP2017/020214.

Aug. 8, 2017 Written Opinion issued in International Patent Application No. PCT/JP2017/020214.

Sato et al. "High energy-resolution electron energy-loss spectroscopy study on the near-infrared scattering mechanism of Cs0.33WO3 crystals and nanoparticles." Journal of Applied Physics, 2012, vol. 112, 074308-1 to 074308-7, doi: 10.1063/1.4752867.

Ozeki et al. "Effects of Spectral Properties of Solar Radiation through Glasses on Thermal Comfort in a Passenger Compartment." Automotive Engineering Society Academic Lecture Preliminary Collection, 1999, No. 33-99, pp. 13-16.

* cited by examiner

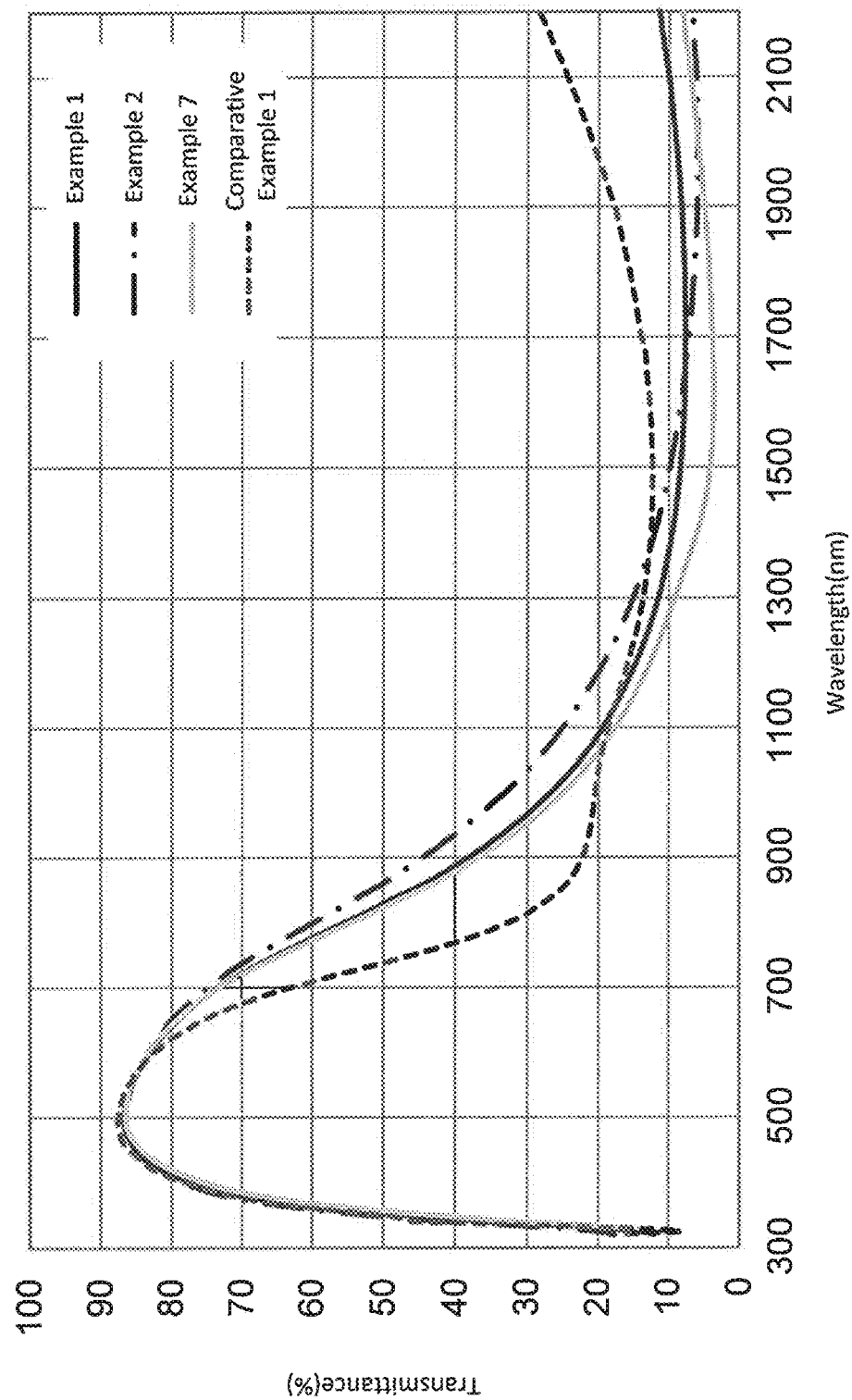

NEAR-INFRARED ABSORBING FINE PARTICLE DISPERSION LIQUID, NEAR-INFRARED ABSORBING FINE PARTICLE DISPERSION BODY, NEAR-INFRARED ABSORBING TRANSPARENT SUBSTRATE, NEAR-INFRARED ABSORBING LAMINATED TRANSPARENT SUBSTRATE

TECHNICAL FIELD

The present invention relates to a near-infrared absorbing fine particle dispersion liquid, a near-infrared absorbing fine particle dispersion body, a near-infrared absorbing transparent substrate, and a near-infrared absorbing laminated transparent substrate containing near-infrared absorbing fine particles that transmit near-infrared light having a predetermined wavelength, while having a good visible light transmittance and having an excellent near-infrared absorbing function.

DESCRIPTION OF RELATED ART

Hitherto various techniques have been proposed as heat ray shielding techniques to lower a solar transmittance, while maintaining transparency with a good visible light transmittance. From among them, heat ray shielding techniques using conductive fine particles, a dispersion body of conductive fine particles, or a laminated transparent substrate, have merits such as excellent heat ray shielding properties and low cost compared to other techniques, transparency to radio waves, and moreover high weather resistance.

For example, patent document 1 discloses a transparent resin containing tin oxide fine powder in a dispersed state, and an infrared absorbing synthetic resin molded product obtained by molding a transparent synthetic resin containing tin oxide fine powder in a dispersed state into a sheet or a film, which is then laminated onto a transparent synthetic resin substrate.

Patent document 2 proposes a laminated glass in which an intermediate layer is sandwiched between at least two opposing glass sheets, the intermediate layer having dispersed therein a metal such as Sn, Ti, Si, Zn, Zr, Fe, Al, Cr, Co, Ce, In, Ni, Ag, Cu, Pt, Mn, Ta, W, V, and Mo, a metal oxide thereof, a metal nitride thereof, a metal sulfide thereof, one of these metals doped with a dopant of Sb or F, or a mixture thereof.

Further, the applicant has disclosed in patent document 3 a selectively transmissive layer coating solution having dispersed therein at least one kind of fine particle from out of titanium nitride fine particles and lanthanum boride fine particles, and a selectively transmissive layer thereof.

However, heat ray shielding structures disclosed in patent documents 1 to 3, such as the infrared absorptive synthetic resin molded product, all involve a problem of insufficient heat ray shielding performance when a high visible light transmittance is required. For example, as an example of a specific numerical value of the heat ray shielding performance of the heat ray shielding structure disclosed in Patent Documents 1 to 3, a solar radiation transmittance (sometimes referred to simply as "solar radiation transmittance" in the present invention) calculated based on JIS R 3106 exceeds 50%, when the visible light transmittance (which may be described simply as "visible light transmittance" in the present invention) calculated based on JIS R 3106 is 70%.

Therefore, an applicant discloses an infrared shielding material fine particle dispersion body in Patent Document 4, which is an infrared shielding material fine particle dispersion body formed by dispersing infrared shielding material fine particles in a medium, wherein the infrared shielding material fine particles are contain composite tungsten oxide fine particles represented by a general formula MxWyOz (wherein element M is one or more elements selected from a group consisting of Mg, Zr, Cr, Mn, Fe, Ru, Co, Rh, Ir, Ni, Pd, Pt, Cu, Sb, B, F, P, S, Se, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, and satisfying $0.001 \leq x/y \leq 1$, $2.2 \leq z/y \leq 3.0$), the composite tungsten oxide fine particles contain at least one of fine particles having a hexagonal, tetragonal, or cubic crystal structure, and a particle size of the infrared shielding material fine particles is 1 nm or more and 800 nm or less.

As disclosed in Patent Document 4, the solar radiation shielding dispersion body using the composite tungsten oxide fine particles represented by the general formula $M_xW_yO_z$ exhibits high solar radiation shielding performance, and when a visible light transmittance is 70%, a solar radiation transmittance is improved to less than 50%. A fine particle dispersion body has a solar radiation shielding function, in which the composite tungsten oxide fine particles are used, with at least one selected from specific elements such as Cs, Rb, and Tl adopted as the element M, having a crystal structure of a hexagonal crystal structure, and shows outstanding solar shielding performance, and when the visible light transmittance was 70%, the solar transmittance is improved to less than 37%.

PRIOR ART DOCUMENT

Patent Document

[Patent document 1] Japanese Unexamined Patent Publication. No. 1990-136230
[Patent document 2] Japanese Unexamined Patent Publication No. 1996-259279
[Patent document 3] Japanese Unexamined Patent Publication No. 1999-181336
[Patent document 4] International Publication (WO) No. 2005/037932
[Patent document 5] Japanese Unexamined Patent Publication No 2010-228959

However, a new problem has been found as a result of an expanded range of markets using the composite tungsten oxide fine particles represented by the general formula $M_xW_yO_z$ and a near-infrared absorbing dispersion body, a near-infrared absorbing film, a near-infrared absorbing glass, a near-infrared absorbing fine particle dispersion body, a near-infrared absorbing transparent substrate and a near-infrared absorbing fine particle laminated transparent substrate using the composite tungsten oxide fine particles.

This problem is that when composite tungsten oxide fine particles represented by the general formula $M_xW_yO_z$, and the near-infrared absorbing film and the near-infrared absorbing glass containing the composite tungsten oxide fine particles, and a dispersion body and the near-infrared absorbing laminated transparent substrate containing the composite tungsten oxide fine particles, are applied to structures such as window materials and the like, there is a large decrease in the transmittance of a near-infrared light in the wavelength range of 700 nm to 1200 nm, when the light passes through these window materials and the like.

Since the near-infrared light in such a wavelength region is substantially invisible to the human eye, and is transmittable by an inexpensive light source such as a near-infrared LED or the like, the near-infrared light is widely utilized for communication, imaging devices, sensors, and the like. However, structures such as window materials and the like, heat ray shielding body and heat ray shielding substrate, and structures such as dispersion body and laminated transparent substrate and the like that employ the composite tungsten oxide fine particles represented by the general formula $M_xW_yO_z$ also strongly absorb the near-infrared light in such a wavelength region, together with absorbing near-infrared lights.

This sometimes results in limitations being placed to usage of communication, imaging devices, sensors, and the like that use the near-infrared light through structures such as window materials and the like, the near-infrared absorbing film, the near-infrared absorbing glass, the dispersion body and laminated transparent substrate that employ the composite tungsten oxide fine particles represented by the general formula $M_xW_yO_z$.

For example, when the near-infrared absorbing film employing the composite tungsten oxide fine particles disclosed in patent document 4 is stuck onto the windows of ordinary housing, this interferes with communication by the near-infrared light between infrared transmitters placed indoors and intrusion detectors configured from infrared receivers placed outdoors, and the devices do not operate normally.

In addition, in the composite tungsten oxide fine particles represented by the general formula $M_xW_yO_z$, and the near-infrared absorbing dispersion body, the near-infrared absorbing film, the near-infrared absorbing glass, the near-infrared absorbing fine particle dispersion body, and the laminated transparent substrate, absorption of the infrared light in the vicinity of the wavelength of 2100 nm is not sufficient.

It is known that when the infrared light in this wavelength range is received on the skin, people feels scorching heat (See, for example, Yoshikazu Ozeki et al., Automotive Engineering Society Academic Lecture Preliminary Collection No. 33-99, 13 (1999)). Accordingly, when the near-infrared absorbing fine particle dispersion body described in Patent Document 4 is applied to windows, it is difficult to shield the scorching heat.

In view of the above circumstances, the present invention is configured as follows. In order to solve this problem, the near-infrared absorbing fine particle dispersion liquid, the near-infrared absorbing fine particle dispersion body, the near-infrared absorbing transparent substrate, and the near-infrared absorbing laminated transparent substrate containing the near-infrared absorbing fine particles are provided, thereby as well as exhibiting heat ray shielding properties and suppressing a scorching sensation on the skin when used in structures such as window materials and the like, also enabling usage of communication devices, imaging devices, sensors and the like that employ the near-infrared light through these structures, the near-infrared absorbing film or the near-infrared absorbing glass, the dispersion body and the laminated transparent substrate.

Means for Solving the Problem

The inventors of the present invention have performed various investigations to solve the above problem.

For example, it is considered that to enable the usage of communication devices, imaging devices, sensors and the like employing near-infrared light even through the near-infrared absorbing film, the near-infrared absorbing glass, the near-infrared absorbing dispersion body, and the near-infrared absorbing laminated transparent substrate, it would be sufficient to raise the transmittance of the near-infrared light in a wavelength range of 800 nm to 900 nm. Then, in order to simply raise the transmittance of the near-infrared light in such a wavelength region, it is considered that it would be sufficient to appropriately reduce the in-layer concentration of the composite tungsten oxide fine particles, the concentration of the composite tungsten oxide fine particles in the near-infrared absorbing film and the near-infrared absorbing glass, and the in-layer concentration of the composite tungsten oxide fine particles in the near-infrared absorbing dispersion body and the near-infrared absorbing laminated transparent substrate.

However, when the concentration of the composite tungsten oxide fine particles or the in-layer concentration of the composite tungsten oxide fine particles in the near-infrared absorbing dispersion body and the near-infrared absorbing laminated transparent substrate are decreased, there is also at the same time a reduction of a near-infrared light absorption capability, with transmittance being at a bottom in the wavelength range of 1200 nm to 1800 nm, causing a reduction in the near-infrared absorbing effect, and resulting in a scorching sensation also being felt on the skin.

It can be considered that in sunlight it is the near-infrared light having a wavelength range of 1500 nm to 2100 nm that greatly influence the scorching sensation on the skin (see, for example, Proceedings of Society of Automotive Engineers of Japan No. 33-99, 13 (1999) by OZEKI Yoshiichi et. al.). This is because although human skin only has a small absorbance for the near-infrared light in the wavelength range of 700 nm to 1200 nm, human skin has a large absorbance for the near-infrared light in the wavelength range of 1500 nm to 2100 nm.

Based on the above knowledge, and as a result of their various investigations, the inventors of the present invention have focused on the following point: in the composite tungsten oxide fine particles represented by the general formula MxWOy, its near-infrared absorption capability is constituted of two kinds of elements, plasmon resonance absorption and polaron absorption. Then, it is found that a wavelength region of the near-infrared light absorbed by the two kinds of constituent elements is different. The present inventors achieve a revolutionary structure in which an absorption level of polaron is controlled while maintaining the plasmon resonance absorption in the composite tungsten oxide fine particles.

Specifically, since a near-infrared absorption band of the composite tungsten oxide fine particles is constituted of the plasmon resonance absorption with the bottom in the wavelength range of 1200 to 1800 nm and the polaron absorption in the wavelength range of 700 to 1200 nm, the present inventors obtain a knowledge that by controlling the absorption level of polaron while maintaining the plasmon resonance absorption, the absorption in the wavelength range of 800 to 900 nm is controlled while maintaining the near-infrared absorbing capability with the bottom in the wavelength range of 1200 to 1800 nm, and it is possible to obtain the composite tungsten oxide fine particles with improved absorption capability at a wavelength of 2100 nm.

Then, the inventors of the present invention achieve a configuration for controlling the polaron absorption by controlling an amount of oxygen vacancies in the composite tungsten oxide fine particle crystals.

However, the present inventors are concerned about the following point: the composite tungsten oxide fine particles with improved transmittance of the near-infrared light in the wavelength range of 800 to 900 nm by controlling the polaron absorption capability, is inferior to the conventional composite tungsten oxide, when evaluated by using an index conventionally used as an evaluation standard of a near-infrared absorbing performance in the near-infrared absorbing fine particle dispersion body (for example, solar radiation transmittance compared to visible light transmittance evaluated based on JIS R 3106).

Therefore, from this viewpoint, the composite tungsten oxide fine particles with improved transmittance of the near-infrared light in the wavelength range of 800 to 900 nm were further investigated by controlling the absorption level of polaron.

Then, it is found that the composite tungsten oxide fine particles with improved transmittance of the near-infrared light in the wavelength range of 800 to 900 nm by controlling the absorption level of polaron as described above, are not inferior in performance as the near-infrared absorbing fine particles, compared to the conventional composite tungsten oxide fine particles.

This is because in the composite tungsten oxide fine particles with improved transmittance of the near-infrared light in the wavelength range of 800 to 900 nm by controlling the absorption level of polaron, although an absolute value of the plasmon absorption is decreased, transmittance of the visible light is increased, and accordingly the concentration of the composite tungsten oxide fine particles per unit area can be further increased. As a result of setting such a high concentration, transmission of the near-infrared lights in the wavelength range of 1500 to 2100 am can be suppressed.

As a result of the above examination, the inventors of the present invention found the composite tungsten oxide fine particles having the near-infrared absorbing function, in which an average value of the transmittance in the wavelength range of 800 to 900 nm is 30% or more and 60% or less, and an average value of the transmittance in the wavelength range of 1200 to 1500 nm is 20% or less, and the transmittance at the wavelength of 2100 nm is 22% or less, and the near-infrared absorbing fine particle dispersion liquid using the near-infrared absorbing fine particles.

Namely, in order to solve the above-described problem, a first invention is a near-infrared absorbing fine particle dispersion liquid, containing at least composite tungsten oxide fine particles and antimony doped tin oxide fine particles and/or tin doped indium oxide fine particles as near-infrared absorbing fine particles, wherein in the composite tungsten oxide fine particles, an average value of a transmittance in a wavelength range of 800 to 900 nm is 30% or more and 60% or less, and an average value of a transmittance in a wavelength range of 1200 to 1500 nm is 20% or less, and a transmittance at a wavelength of 2100 nm is 22% or less, when a visible light transmittance is 85% at the time of calculating only light absorption by the composite tungsten oxide fine particles, and containing mixed particles of the composite tungsten oxide fine particles and antimony-doped tin oxide fine particles and/or tin-doped indium oxide fine particles dispersed in a liquid medium, wherein the liquid medium is selected from water, an organic solvent, an oil and fat, a liquid resin, a liquid plasticizer for plastics, or a mixture thereof, wherein when a visible light transmittance is adjusted to 85% at the time of calculating only light absorption by the near-infrared absorbing fine particles in the dispersion liquid by diluting with the liquid medium, an average value of a transmittance in the wavelength range of 800 to 900 nm is 30% or more and 60% or less, an average value of a transmittance in the wavelength range of 1200 to 1500 nm is 20% or less, and a transmittance at the wavelength of 2100 nm is 11% or less.

A second invention is the near-infrared absorbing fine particle dispersion liquid, wherein a weight ratio of the composite tungsten oxide fine particles to the antimony doped tin oxide fine particles and the tin doped indium oxide fine particles is in a range of composite tungsten oxide fine particles/(antimony doped tin oxide fine particles+tin doped indium oxide fine particles)=90/10 to 20/80.

A third invention is the near-infrared absorbing fine particle dispersion liquid, wherein each composite tungsten oxide fine particle has a hexagonal crystal structure.

A fourth invention is a near-infrared absorbing fine particle dispersion body, wherein mixed particles containing at least composite tungsten oxide fine particles, antimony-doped tin oxide fine particles and/or tin-doped indium oxide fine particles, are dispersed in a solid binder, wherein in the composite tungsten oxide fine particles, an average value of the transmittance in the wavelength range of 800 to 900 nm is 30% or more and 60% or less, and an average value of the transmittance at a wavelength of 1200 to 1500 nm is 20% or less, and the transmittance at a wavelength of 2100 nm is 22% or less, and the near-infrared absorbing fine particle dispersion liquid using the near-infrared absorbing fine particles.

A fifth invention is the near-infrared absorbing fine particle dispersion body, wherein the binder comprises at least a thermoplastic resin or a UV curable resin.

A sixth invention is the near-infrared absorbing fine particle dispersion body, wherein the transparent thermoplastic resin is any one of:

one resin selected from a resin group consisting of polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene•vinyl acetate copolymer, polyvinyl acetal resin, a mixture of two or more resins selected from the above resin group, or a copolymer of two or more resins selected from the above resin group.

A seventh invention is the near-infrared absorbing fine particle dispersion body, containing the near-infrared absorbing fine particles in an amount of 0.001 mass % or more and 80.0 mass % or less.

An eighth invention is the near-infrared absorbing fine particle dispersion body, wherein the near-infrared absorbing fine particle dispersion body is formed in a sheet shape, a board shape, or a film shape.

A ninth invention is the near-infrared absorbing fine particle dispersion body, wherein a content of the near-infrared absorbing fine particles per unit projected area contained in the near-infrared absorbing fine particle dispersion body is 0.04 g/m$^2$ or more and 10.0 g/m$^2$ or less.

A tenth invention is the near-infrared absorbing fine particle dispersion body, wherein an average value of a transmittance in a wavelength range of 800 to 900 nm is 13% or more and 42% or less, an average value of a transmittance in a wavelength range of 1200 to 1500 nm is 8% or less, and a transmittance at a wavelength of 2100 nm is 5% or less, when a visible light transmittance is 70%, An eleventh invention is a near-infrared absorbing transparent substrate, wherein the near-infrared absorbing fine particle dispersion body according to any one of fourth invention to tenth invention is formed on at least one surface of a transparent substrate which is a resin substrate or a glass substrate.

A twelfth invention is the near-infrared absorbing transparent substrate, wherein a thickness of the near-infrared absorbing fine particle dispersion body is 10 μm or less.

A thirteenth invention is the near-infrared absorbing transparent substrate, wherein the transparent substrate is the resin substrate and the resin substrate is a polyester film.

A fourteenth invention is the near-infrared absorbing transparent substrate, wherein an average value of a transmittance in a wavelength range of 800 to 900 nm is 12% or more and 40% or less, an average value of a transmittance in a wavelength range of 1200 to 1500 nm is 8% or less, and a transmittance at a wavelength of 2100 nm is 3.0% or less, when a visible light transmittance is 70%.

A fifteenth invention is a near-infrared absorbing laminated transparent substrate, wherein the near-infrared absorbing fine particle dispersion body of any one of the fourth to tenth inventions is present between a plurality of transparent substrates.

A sixteenth invention is the near-infrared absorbing laminated transparent substrate, wherein an average value of a transmittance in a wavelength range of 800 to 900 nm is 12% or more and 40% or less, an average value of a transmittance in a wavelength range of 1200 to 1500 nm is 8% or less, and a transmittance at a wavelength of 2100 nm is 3.0% or less, when a visible light transmittance is 70%.

Advantage of the Invention

The structure, the near-infrared absorbing film or glass, and the near-infrared absorbing dispersion body and the laminated transparent substrate using the near-infrared absorbing fine particle dispersion liquid of the present invention, have a target near-infrared absorption properties, and therefore exhibit near-infrared light shielding properties or heat ray shielding properties by shielding solar radiation while transmitting a visible light, suppress a scorching sensation on the skin, and enable the usage of the communication devices, imaging devices, sensors and the like using the near-infrared light even when interposing the above structure, etc.

BRIEF DESCRIPTION OF THE DRAWINGS

FIG. 1 is a transmittance profile of the near-infrared absorbing fine particle dispersion liquid according to examples 1, 2, 7 and comparative example 1.

DETAILED DESCRIPTION OF THE INVENTION

The present invention relates to near-infrared absorbing fine particles in which an average value of a transmittance in a wavelength range of 800 to 900 nm is 30% or more and 60% or less, and an average value of a transmittance in a wavelength range of 1200 to 1500 nm is 20% or less, and a transmittance at a wavelength of 2100 nm is 22% or less when a visible light transmittance is 85% at the tune of calculating only a light absorption by the composite tungsten oxide fine particles, and the near-infrared absorbing fine particle dispersion liquid using the near-infrared absorbing fine particles.

The composite tungsten oxide fine particles have a high visible light transmittance and a characteristic of absorbing infrared light on a long wavelength side. Meanwhile, it is known that fine particles of antimony-doped tin oxide (sometimes referred to as "ATO" in the present invention) and fine particles of tin-doped indium oxide (sometimes referred to as "ITO" in the present invention) are used as near-infrared absorbing materials.

It is found by the inventors of the present invention, that by replacing a part of the composite tungsten oxide fine particles with ATO fine particles and/or ITO fine particles, a transmittance at a wavelength of 2100 nm can be further suppressed while suppressing an influence on a near-infrared light absorbing function. Thereby, a near-infrared absorbing fine particle dispersion liquid is found, in which when the composite tungsten oxide fine particles and mixed particles of ATO fine particles and/or ITO fine particles are dispersed in a solvent, a visible light transmittance at the time of calculating only the light absorption by the near-infrared absorbing fine particles is 85%, and at this time, an average value of a transmittance in the wavelength range of 800 to 900 nm is 30% or more and 60% or less, an average value of a transmittance in the wavelength range of 1200 to 1500 nm is 20% or less, and a transmittance at the wavelength of 2100 nm is 11% or less.

Further, it is found by the inventors of the present invention, that the near-infrared absorbing material, the near-infrared absorbing film and the near-infrared absorbing glass, the near-infrared absorbing dispersion body and the laminated transparent substrate using the composite tungsten oxide fine particles of the present invention, are not inferior in performance as near-infrared absorbers, and are equivalent to the tungsten oxide fine particles of a conventional technique from a viewpoint of suppressing a scorching sensation on the skin.

Embodiments of the present invention will be described hereafter in an order of [a] Composite tungsten oxide fine particles, [b] Method for producing composite tungsten oxide fine particles, [c] Antimony-doped tin oxide fine particles and tin-doped indium oxide fine particles, and methods for producing them, [d] Mixing of composite tungsten oxide fine particles and antimony-doped tin oxide fine particles and/or tin-doped indium oxide fine particles, [e] Near-infrared absorbing fine particle dispersion liquid, [f] Near-infrared absorbing fine particle-containing dispersion body, and method for producing the same, [g] Near-infrared absorbing laminated transparent substrate and method for producing the same, [h] Near-infrared absorbing transparent substrate and method for producing the same.

[a] Composite Tungsten Oxide Fine Particles

The composite tungsten oxide fine particles of the present invention are the composite tungsten oxide fine particles in which when later-described light absorption properties of the near-infrared absorbing fine particle dispersion liquid are analyzed, with a liquid medium of the near-infrared absorbing fine particle dispersion liquid as a baseline, namely, when only light absorption by the composite tungsten oxide fine particles is calculated, an average value of a transmittance in the wavelength range of 800 to 900 nm is 30% or more and 60% or less, an average value of a transmittance in the wavelength range of 1200 to 1500 nm is 20% or less, and a transmittance at the wavelength of 2100 nm is 22% or less, when a visible light transmittance is adjusted to 85%. Note that in the present invention, "an averaged value of a transmittance" means an arithmetic average of a transmittance in a specified wavelength range.

It is preferable that the composite tungsten oxide fine particles include a hexagonal crystal structure.

The composite tungsten oxide fine particles are represented by a general formula $M_xW_yO_z$, wherein element M is one or more element selected from a group consisting of H, He, alkali metal, alkaline earth metal, rare earth element, Mg, Zr, Cr, Mn, Fe, Ru, Co, Rh, Ir, Ni, Pd, Pt, Cu, Ag, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, and O is oxygen.

A value of x/y representing an addition amount of the element M is preferably 0.001 or more and 1 or less, more preferably 0.1 or more and 0.5 or less, and further preferably 0.18 or more and 0.39 or less. This is because when the value of x is 0.18 or more and 0.39 or less, a hexagonal crystal single phase is easily obtained and a near-infrared absorbing effect is sufficiently exhibited. In addition to the hexagonal crystal, tetragonal crystal or orthorhombic crystal represented by $M_{0.36}WO_{3.18}$ ($Cs_4W_{11}O_{35}$) is sometimes precipitated, but these precipitates do not affect the near-infrared absorbing effect. Theoretically, as the value of x/y becomes 0.33, it is considered that the added element M is arranged in all the hexagonal voids.

Further, a value of z/y is preferably $2.0<z/y\leq3.0$, more preferably, $2.2\leq z/y\leq3.0$, more preferably, $2.6\leq z/y\leq3.0$, and further more preferably $2.7\leq z/y\leq3.0$. This is because if the value of z/y is 2.0 or more, it is possible to avoid an appearance of a crystal phase of $WO_2$ other than a target in the composite tungsten oxide, and chemical stability as a material can be obtained, and therefore application as an effective infrared absorption material is possible. Meanwhile, if the value of z/y is 3.0 or less, a required amount of free electrons are generated in the tungsten oxide and become an efficient infrared absorbing material.

Further, a part of oxygen in the composite tungsten oxide may be substituted with another element. Examples of another element include nitrogen, sulfur, halogen or the like.

A particle size of the composite tungsten oxide fine particles of the present invention can be appropriately selected according to the purpose of using the composite tungsten oxide fine particles and the near-infrared absorbing film/near-infrared absorbing substrate produced using the composite tungsten oxide fine particles and the dispersion liquid of them. However, the particle size is preferably 1 nm or more and 800 nm. This is because if the particle size is 800 nm or less, it is possible to exhibit strong near-infrared absorption by the composite tungsten oxide fine particles of the present invention, and if the particle size is 1 nm or more, industrial production is easy.

When the near-infrared absorbing film is used for applications requiring transparency, it is preferable that the composite tungsten oxide fine particles have a dispersed particle size of 40 nm or less. Here, the dispersed particle size is 50% volume cumulative particle size measured by a particle size distribution meter utilizing laser diffraction. This is because if the composite tungsten oxide fine particles have a dispersed particle size of smaller than 40 nm, scattering of light due to Mie scattering and Rayleigh scattering of fine particles is sufficiently suppressed, and it is possible to maintain visibility in a visible light wavelength region and at the same time maintain transparency efficiently. When used for applications requiring transparency such as automobile windshields, in order to further suppress the scattering, the dispersed particle size of the composite tungsten oxide fine particles is preferably 30 nm or less, more preferably 25 nm or less.

Here, explanation will be given for a case that the value of z/y is 2.7 or more and 3.0 or less.

The near-infrared absorption capability of the composite tungsten oxide represented by the general formula $M_xW_yO_z$ consists of two kinds of elements: localized surface plasmon resonance absorption by free electrons and polaron absorption by localized electrons, and a wavelength range of the near-infrared light absorbed by the two kinds of constituent elements is different. When the value of z/y is 2.7 or more and 3.0 or less, an amount of oxygen vacancies in the composite tungsten oxide is decreased, and therefore absorption by polaron is weakened, and the transmittance of the near-infrared light in the wavelength range of 800 to 900 nm can be improved while securing the near-infrared absorption capability in the wavelength range of 1200 to 1500 nm, with the wavelength range of 1200 to 1800 nm as a bottom. Further, since a free electron density is also decreased, the center of an energy of the localized surface plasmon resonance is shifted to a longer wavelength side, and the near-infrared absorption capability at a wavelength of 2100 nm is improved.

As described above, it can be considered that a wide absorption which the composite tungsten oxide fine particles have in the near-infrared light region, has two absorption mechanisms: localized surface plasmon absorption by free electrons and polaron absorption by localized electrons. (See, for example, J. Appl. Phys. 112, 074308 (2012).). Then, it can be considered that a strong absorption is caused in the near-infrared light region in a wavelength range of 700 to 1200 nm, due to the absorption by polaron. Note that a peak energy of the polaron absorption is 1.5 eV (wavelength 826 nm).

Meanwhile, absorption of even larger near-infrared lights with the wavelength range of 1200 to 1800 nm as a bottom, is absorption by localized surface plasmon resonance by free electrons. Note that a peak energy of the localized surface plasmon resonance is 0.83 eV (wavelength of 1494 nm).

In the composite tungsten oxide fine particles, the absorption level of polaron is varied depending on the strength of a reduction treatment at the time of production as described above. Specifically, as a hydrogen gas concentration to be used is larger within an allowable range, as a treatment temperature is increased, and as a treatment time is longer, the magnitude of the polaron absorption becomes strong.

Accordingly, it is considered that the absorption by polaron is caused by oxygen vacancies in the composite tungsten oxide fine particle crystal.

When the oxygen vacancies are generated in the composite tungsten oxide fine particle crystal, apparently, two electrons are generated. These electrons reduce surrounding tungsten ions $W^{6+}$ to produce $W^{5+}$ and $W^{4+}$. These $W^{5+}$ and $W^{4+}$ attract surrounding cations ($Cs^+$, $W^{6+}$), and exclude surrounding anions ($O^{2-}$). Accordingly, $W^{5+}$ and $W^{4+}$ strongly interact with longitudinal optical phonons, cause electric polarization around itself, and become a quantum that moves by dragging a polarization field, that is, become polaron.

Meanwhile, such a polarization field having distortion, is subjected to large lattice relaxation by oxygen vacancies. Therefore, polaron is expected to be generated adjacent to oxygen vacancies.

Since the electrons captured as polarons move due to thermal motion and electric field, each electron absorbs a light of a specific wavelength due to its movement under irradiation of light. Accordingly, when the oxygen vacancies are increased in the composite tungsten oxide fine particle crystals, more polaron electrons are generated, and the near-infrared light absorption in the wavelength range of 800 to 900 nm becomes stronger.

In contrast, when the oxygen vacancies are decreased, the polaron electrons are decreased and the light absorption is also decreased. Accordingly, it can be considered that the absorption of the near-infrared light in the wavelength range of 800 to 900 nm is decreased and the transmittance of the near-infrared light can be improved, while securing the near-infrared absorbing capability in the wavelength range of 1200 to 1500 nm, with the wavelength of 1200 to 1800 nm as the bottom.

In addition, a part of the electrons supplied from the oxygen vacancies becomes free electrons in a conduction band and spreads throughout the crystal, and acts as electrons contributing to plasmon resonance.

Accordingly, as the number of oxygen vacancies is increased, the free electron density is increased and the plasmon resonance wavelength is changed slightly to a shorter wavelength side from 0.83 eV (wavelength 1494 nm).

In contrast, as the number of oxygen vacancies is decreased, the free electron density is decreased and the resonance wavelength is slightly shifted to the longer wavelength side. By shifting to the longer wavelength side, the effect of securing the absorption capability at the wavelength of 2100 mm is an effect of further reducing the scorching sensation on the skin and is useful in practical use.

A c-axis lattice constant of the composite tungsten oxide fine particles of the present invention, is one of indicators reflecting the strength of the above-described reduction treatment and the near-infrared absorption capability. When the composite tungsten oxide fine particles have the above-described dispersed particle size, the c-axis lattice constant is preferably 7.56 Å or more and 8.82 Å or less, and more preferably 7.56 Å or more and 7.61 Å or less.

[b] Method for Producing Composite Tungsten Oxide Fine Particles

The composite tungsten oxide fine particles of the present invention can be obtained by heat-treat a tungsten compound starting material in a reducing gas atmosphere First, explanation follows regarding the tungsten compound starting material.

The tungsten compound starting material of the present invention is a mixture containing tungsten and element M in elemental form or as compounds. As the tungsten raw material, preferably one or more raw materials are selected from a tungstic acid powder, a tungsten trioxide powder, a tungsten dioxide powder, a hydrate powder of tungsten oxide, a tungsten hexachloride powder, an ammonium tungstate powder, or a hydrate powder of tungsten oxide obtained by dissolving tungsten hexachloride powder in alcohol and then drying, or a hydrate powder of tungsten oxide obtained by dissolving tungsten hexachloride in alcohol, then adding water thereto so as to be precipitated, or a tungsten compound powder obtained by drying an aqueous solution of ammonium tungstate, and a tungsten metal powder. Examples of the raw material of the element M include element M in elemental form, and a chloride salt, a nitrate salt, a sulfate salt, an oxalate salt, an acetate, an oxide, a carbonate, a tungstic acid salt, and a hydroxide of element M, and the like; however, there is no limitation thereto.

Each of the above-mentioned starting material of the tungsten compound was weighed, which was then mixed in predetermined amounts so as to satisfy $0.001 < x/y \leq 1$. At this time, the respective raw materials of the tungsten and the element M are mixed as uniformly as possible, and if possible are preferably uniformly mixed at the molecular level. Thus, each of the above raw material are most preferably mixed in the form of solutions, and each of the raw materials is preferably soluble in a solvent such as water, an organic solvent, or the like.

When the raw materials are each soluble in a solvent such as water, an organic solvent, or the like, then the tungsten compound starting material of the present invention can be produced by evaporating off the solvent after sufficiently mixing each of the raw materials and the solvent. Naturally, even without a solvent in which each of the raw materials is soluble, the tungsten compound starting material of the present invention can be produced by sufficiently uniformly mixing the raw materials together using a known means such as a ball mill.

Next, the heat treatment in the reducing gas atmosphere will be described. The starting material is preferably heat-treated at 300° C. or more and 900° C. or less, more preferably 500 to 800° C. or less, still more preferably 500 to 600° C. or less. When the temperature is 300° C. or more, a producing reaction proceeds in the composite tungsten oxide having a hexagonal structure according to the present invention, and when the temperature is 900° C. or less, undesirable side reaction products such as composite tungsten oxide fine particles having a structure other than hexagonal crystal and metal tungsten are unlikely to be formed, which is preferable.

The reducing gas at this time is not particularly limited, but $H_2$ is preferable. Then, when $H_2$ is used as the reducing gas, as a composition of the reducing atmosphere, for example, a composition in which $H_2$ is mixed with an inert gas such as Ar, $N_2$ or the like in a volume ratio of 0.1 to 0.8% is preferable, and 0.1 to 0.5% mixture is more preferable. When $H_2$ is in the volume ratio of 0.1% to 0.8%, reduction can be promoted efficiently while controlling the generation of the oxygen vacancies. Conditions such as reduction temperature and reduction time, kind and concentration of the reducing gas can be appropriately selected according to an amount of a sample.

If necessary, heat treatment may be performed in the inert gas atmosphere after reduction treatment is performed in the reducing gas atmosphere. In this case, the heat treatment in the inert gas atmosphere is preferably performed at a temperature of 400° C. or more and 1200° C. or less.

It is preferable that the near-infrared absorbing fine particles of the present invention are surface-treated and coated with a compound containing one or more kinds selected from Si, Ti, Zr and Al, preferably with an oxide, from a viewpoint of improving weather resistance. In order to perform the surface treatment, known surface treatment may be performed using an organic compound containing one or more selected from Si, Ti, Zr and Al. For example, the near-infrared absorbing fine particles of the present invention and an organosilicon compound may be mixed and hydrolyzed.

[c] Antimony-Doped Tin Oxide Fine Particles and Tin-Doped Indium Oxide Fine Particles and a Method for Producing the Same The antimony-doped tin oxide fine particles (ATO) of the present invention may be any one as long as antimony is doped in tin oxide, and is not particularly limited.

ATO fine particles have little absorption or reflection of light in the visible light region, and reflection/absorption derived from plasma resonance is large in a wavelength range of 1500 nm or more. Namely, in a transmission profile of the ATO fine particles, the transmittance is decreased toward a long wavelength side in the near-infrared region.

The ATO fine particles used in the present invention, can be obtained for example by co-precipitating a hydroxide containing tin and a hydroxide containing antimony in an aqueous solution and firing the obtained precipitate at a temperature of 500° C. or more and less than 1100° C.

Further, the tin-doped indium oxide fine particles (ITO) of the present invention is not particularly limited as long as indium oxide is doped with tin.

ITO fine particles have little absorption or reflection of light in the visible light region, and reflection and absorption derived from plasma resonance are large in the wavelength range of 1500 nm or more. Namely, in a transmission profile of ITO fine particles, the transmittance is decreased toward the long wavelength side in the near-infrared region.

The ITO fine particles to be used in the present invention, can be obtained for example, by co-precipitating a hydroxide containing indium and a hydroxide containing tin in an aqueous solution and firing the obtained precipitate at a temperature of 500° C. or more and less than 1100° C. The atmosphere at the time of firing is inert gas or reducing gas, and it is preferably the reducing gas. This is because by forming a small amount of oxygen defects in the ITO fine particles, absorption in the infrared region is strengthened.

[d] Mixing of Composite Tungsten Oxide Fine Particles and Antimony-Doped Tin Oxide Fine Particles and/or Tin-Doped Indium Oxide Fine Particles As described above, by mixing the composite tungsten oxide with the fine particles of ATO and/or ITO at an appropriate mixing ratio and using them as a mixture, it is possible to suppress the transmission of the near-infrared lights in the vicinity of the wavelength of 2100 nm which adds a scorching heat on the skin, and have a near-infrared absorption capability with a wavelength range of 1200 to 1800 nm at the bottom, while improving the transmittance of the near-infrared light in the wavelength range of 800 to 900 nm.

The weight ratio of the composite tungsten oxide fine particles to the fine particles of ATO and/or ITO is, preferably in a range of the composite tungsten oxide fine particles/(ATO fine particles+ITO fine particles)=90/10 to 20/80. When the ratio of the composite tungsten oxide fine particles is 20 or more, it is possible to maintain excellent near-infrared absorption properties derived from the composite tungsten oxide fine particles. Further, when the ratio of the fine particles of ATO and/or ITO is 10 or more, it is possible to improve the transmittance of the near-infrared light having a wavelength of 800 to 900 nm derived from antimony-doped tin oxide, and have a high effect of suppressing the transmission of the near-infrared light in the vicinity of the wavelength of 2100 nm which adds a scorching heat on the skin.

[e] Near-Infrared Absorbing Fine Particle Dispersion Liquid

By dispersing a mixture of the composite tungsten oxide fine particles and fine particles of ATO and/or ITO in a liquid medium, the near-infrared absorbing fine particle dispersion liquid of the present invention can be produced. In mixing the fine particles, there is a method of mixing the composite tungsten oxide powder and ATO and/or ITO powder and then pulverizing/dispersing the mixed powder to form a fine particle mixture. There is also a method of mixing a dispersion liquid in which the composite tungsten oxide is dispersed and a dispersion liquid in which ATO and/or ITO fine particles are dispersed to form a fine particle mixture.

The near-infrared absorbing fine particle dispersion liquid of the present invention can be used in the same way as a conventional composite tungsten oxide fine particle dispersion liquid and the dispersion liquid of ATO fine particles and/or ITO fine particles, in various fields in which other conventional materials such as composite tungsten oxide disclosed in Patent Document 4, ATO fine particles and ITO fine particles, which strongly absorb near-infrared lights, are used.

The near-infrared absorbing fine particle dispersion liquid of the present invention will be described hereafter, in an order of (1) Method for producing near-infrared absorbing fine particle dispersion liquid, and (2) Application example of near-infrared absorbing fine particle dispersion liquid. In the present invention, the near-infrared absorbing fine particle dispersion liquid may be simply referred to as "dispersion liquid" in some cases.

(1) Method for Producing Near-Infrared Absorbing Fine Particle Dispersion Liquid By adding the near-infrared absorbing fine particles of the present invention and optionally an appropriate amount of a dispersing agent, a coupling agent, a surfactant and the like to a liquid medium and performing dispersion treatment, the near-infrared absorbing fine particle dispersion liquid of the present invention can be obtained. A function of keeping dispersibility of the near-infrared absorbing fine particles and a function of preventing a coating defect when applying the near-infrared absorbing fine particle dispersion liquid, are required for a liquid medium of the near-infrared absorbing fine particle dispersion liquid.

The near-infrared absorbing fine particle dispersion liquid can be produced by selecting as medium water, an organic solvent, oil/fat, a liquid resin, a liquid plasticizer for plastics, or a mixture thereof.

As the organic solvent satisfying these requirements, various organic solvents can be selected, such as an alcohol-based, ketone-based, hydrocarbon-based, glycol-based, or water-based organic solvent. Specific example thereof include: alcohol-based solvents such as methanol, ethanol, 1-propanol, isopropanol, butanol, pentanol, benzyl alcohol, diacetone alcohol and the like; ketone-based solvents such as acetone, methyl ethyl ketone, methyl propyl ketone, methyl isobutyl ketone, cyclohexanone, isophorone and the like; ester-based solvents such as 3-methyl-methoxy-propionate and the like; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate and the like; amides such as formamide, N-methylformamide, dimethylformamide, dimethylacetamide, N-methyl-2-pyrrolidone and the like; aromatic hydrocarbons such as toluene, xylene and the like; and halogenated hydrocarbons such as ethylene chloride, chlorobenzene, and the like. An organic solvent having a low polarity is preferable from out of the above, and, in particular, isopropyl alcohol, ethanol, 1-methoxy-2-propanol, dimethyl ketone, methyl ethyl ketone, methyl isobutyl ketone, toluene, propylene glycol monomethyl ether acetate, n-butyl acetate, and the like are more preferable. These solvents may be used alone or in a combination of two or more thereof.

Preferable examples of the liquid resin are such that monomers, oligomers, and thermoplastic resins or the like, which are cured by polymerization such as methyl methacrylate, styrene or the like, are dissolved in the liquid medium.

Preferable examples of the liquid plasticizer for plastics include a plasticizer that is a compound of a monohydric alcohol and an organic acid ester, an ester-based plasticizer such as polyhydric alcohol organic acid ester compound, and a phosphoric acid-based plasticizer such as an organic phosphate-based plasticizer, and the like. From among the above, triethylene glycol di-2-ethyl hexanoate, triethylene glycol di-2-ethyl butyrate, tetraethylene glycol di-2-ethyl hexanoate are more preferable due to having a low propensity to hydrolysis.

A dispersant, a coupling agent, and a surfactant may be selected according to the application, however preferably a group containing an amine, a hydroxyl group, a carboxyl group, or an epoxy group is included as a functional group thereof. These functional groups are adsorbed onto the surface of the composite tungsten oxide fine particles and the antimony-doped tin oxide fine particles, prevent aggregation of the composite tungsten oxide fine particles and the antimony-doped tin oxide fine particles, and have the effect of uniformly dispersing the near-infrared absorbing fine particles of the present invention even in a near-infrared absorbing layer.

Preferably used examples of dispersants include phosphate ester compounds, polymeric dispersants, silane-based coupling agents, titanate-based coupling agents, aluminum-based coupling agents, and the like, however the present invention is not limited thereto. As the polymeric dispersants, acrylic polymer dispersant, urethane polymer dispersant, acrylic block copolymer type polymer dispersant, polyether dispersant, polyester polymer dispersant, etc., can be used.

An addition amount of the dispersant is preferably in a range from 10 parts by weight to 1000 parts by weight based on 100 parts by weight of the near-infrared absorbing fine particles, and more preferably in a range from 20 parts by weight to 200 parts by weight with respect thereto. When the addition amount of the dispersant is in the above range, dispersion stability is maintained such that aggregation of the near-infrared absorbing fine particles in the liquid does not occur.

The dispersion treatment method may be freely selected from known methods as long as the near-infrared absorbing fine particles are uniformly dispersed in a liquid medium and, for example, a bead mill, a ball mill, a sand mill, ultrasonic dispersion, or the like may be used for the dispersion treatment method.

Various additives and dispersants may be added and pH may be adjusted in order to obtain a homogeneous near-infrared absorbing fine particle dispersion liquid.

The content of the near-infrared absorbing fine particles in the near-infrared absorbing fine particle dispersion liquid described above is preferably 0.01 mass % to 80 mass %. When the content is 0.01 mass % or more, it can be suitably used for production of a coating layer or a plastic molded body or the like described later, and when the content is 80 mass % or less, industrial production is easy. The content is more preferably 1 mass % or more and 35 mass % or less.

The near-infrared absorbing fine particle dispersion liquid of the present invention in which such near-infrared light absorbing fine particles are dispersed in a liquid medium is placed in a suitable transparent container, and the transmittance of the light can be measured as a function of a wavelength using a spectrophotometer.

Specifically, when a visible light transmittance is adjusted to 85% when only light absorption by the near-infrared absorbing fine particles is calculated (simply talking, "the visible light transmittance is 85%" in some cases in the embodiment of the present invention.), with the transmittance of the light of the liquid medium in the near-infrared absorbing fine particle dispersion liquid as a baseline, the transmittance in the wavelength range of 800 to 900 nm is 30% or more and 60% or less, the transmittance at a wavelength of 1200 to 1500 nm is 20% or less, and the transmittance at a wavelength of 2100 urn is 11% or less.

Note that in this measurement, it is easy to adjust the visible light transmittance to 85%, when only light absorption by the near-infrared absorbing fine particles contained in the dispersion liquid is calculated by diluting with a dispersion solvent thereof or an appropriate solvent compatible with the dispersion solvent.

A light transmittance profile of the above-described near-infrared absorbing fine particle dispersion liquid of the present invention has a high transmittance of the near-infrared light in the range of 800 to 900 nm, without significantly increasing the transmittance in the wavelength range of 1200 to 1500 nm, thus improving infrared absorption capability at the wavelength of 2100 nm, compared with a light transmission profile in the case of using the composite tungsten oxide fine particles and the antimony doped tin oxide fine particles disclosed in Patent Document 4 and Patent Document 5.

The content of the near-infrared absorbing fine particles in the above-mentioned near-infrared absorbing fine particle dispersion liquid is preferably 0.01 mass % to 80 mass %, When the content of the near-infrared absorbing fine particles is 0.01 mass % or more, it is possible to obtain a coating layer on a transparent substrate selected from transparent film substrates or transparent glass substrates described later, or a near-infrared absorbing fine particle dispersion body suitable for production of plastic molded bodies and the like. Meanwhile, when the content of the near-infrared absorbing fine particles is 80 mass % or less, industrial production of the near-infrared absorbing fine particle dispersion body is easy. From this viewpoint, more preferably, the content of the near-infrared absorbing fine particles in the near-infrared absorbing fine particle dispersion liquid is 1 mass % or more and 35 mass % or less.

Further, the near-infrared absorbing fine particles in the near-infrared absorbing fine particle dispersion liquid are preferably dispersed with an average dispersed particle size of 40 nm or less. This is because when an average dispersed particle size of the near-infrared absorbing fine particles is 40 nm or less, the optical properties such as haze of the near-infrared absorbing film produced using the near-infrared absorbing fine particle dispersion liquid of the present invention are more preferably improved.

(2) Usage Example of Near-Infrared Absorbing Fine Particle Dispersion Liquid

By dispersing the near-infrared absorbing fine particles or the near-infrared absorbing fine particle dispersion liquid of the present invention in a solid medium, a near-infrared absorbing fine particle-containing dispersion body can be formed, and a near-infrared absorbing film, a near-infrared absorbing plastic molded body, and the like can also be produced. Further, the near-infrared absorbing fine particle dispersion liquid can also be processed into a dispersion powder or a master batch which will be described later, As an example of a general usage, a method for producing a near-infrared absorbing film using the near-infrared absorbing fine particle dispersion liquid of the present invention will be described. By mixing the above-described near-infrared absorbing fine particle dispersion liquid with plastic or monomer to prepare a coating solution and forming a coating layer on the substrate by a known method, a near-infrared absorbing film can be produced.

As the solid medium of the coating layer, for example, a UV curable resin, a thermosetting resin, an electron beam curable resin, a room temperature curable resin, a thermoplastic resin, etc. can be selected according to the purpose. Specifically, polyethylene resin, polyvinyl chloride resin, polyvinylidene chloride resin, polyvinyl alcohol resin, polystyrene resin, polypropylene resin, ethylene vinyl acetate copolymer, polyester resin, polyethylene terephthalate resin, fluorine resin, polycarbonate resin, acrylic resin, and polyvinyl acetal resin, can be used. These resins may be used alone or in combination. Further, it is also possible to use a binder using a metal alkoxide. As the metal alkoxide, alkoxide such as Si, Ti, Al, Zr or the like is representative. The binder using these metal alkoxides can form an oxide film by hydrolysis polycondensation by heating or the like.

The substrate may be a film as described above, but if desired, it may be a board, and its shape is not limited. As the transparent substrate material, PET, acrylic, urethane, polycarbonate, polyethylene, ethylene vinyl acetate copolymer, vinyl chloride, fluorine resin and the like can be used according to various uses. Further, glass can be used other than resin.

[f] Near-Infrared Absorbing Fine Particle-Containing Dispersion Body and Method for Producing the Same Next, one configuration example of the near-infrared absorbing fine particle dispersion body and the method for producing the same according to this embodiment will be described.

The near-infrared absorbing fine particle dispersion body of this embodiment can contain the near-infrared absorbing fine particles of this embodiment and a binder. Therefore, regarding a portion overlapping with the above-described contents, explanation is partially omitted.

Each component that can be contained in the near-infrared absorbing fine particle dispersion body of this embodiment will be described below.

First, the solid medium will be described.

The solid medium is not particularly limited as long as it can be solidified in a state in which the near-infrared absorbing fine particles are dispersed. For example, there are inorganic binders obtained by hydrolysis of metal alkoxides, and organic binders such as resins. Particularly, the binder preferably contains a thermoplastic resin or a UV curable resin. Note that in the near-infrared light absorbing fine particle dispersion body of this embodiment, the solid medium can be used as long as it is in a liquid state in a production process or becomes a solid finally.

When the solid medium contains a thermoplastic resin, the thermoplastic resin is not particularly limited, and can be arbitrarily selected according to required transmittance, strength, etc. As the thermoplastic resin, for example, any one of the following resins can be used: one kind of resin selected from a resin group consisting of polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene•vinyl acetate copolymer, and polyvinyl acetal resin, or a mixture of two or more kinds of resins selected from this resin group, or copolymers of two or more kinds of resins selected from this resin group.

Meanwhile, when the solid medium contains a UV curable resin, the UV curable resin is not particularly limited, and for example, an acrylic UV curable resin can be suitably used.

The content of the near-infrared absorbing fine particles dispersed and contained in the near-infrared absorbing fine particle dispersion body is not particularly limited, and can be arbitrarily selected according to usage and the like. The content of the near-infrared absorbing fine particles in the near-infrared absorbing fine particle dispersion body is, for example, preferably 0.001 mass % or more and 80.0 mass % or less, more preferably 0.01 mass % or more and 70.0 mass % or less.

This is because if the content of the near-infrared absorbing fine particles in the near-infrared absorbing fine particle dispersion body is 0.001 mass % or more, there is no necessity for particularly increasing the thickness of the dispersion body in order to obtain the infrared absorbing effect required for the near-infrared absorbing fine particle dispersion body, and usable applications are not limited, and transport is easy.

Further, this is because if the content of the near-infrared absorbing fine particles is 80.0 mass % or less, the ratio of the thermoplastic resin or the UV curable resin can be secured in the near-infrared absorbing fine particle dispersion body and the strength can be maintained.

Further, from a viewpoint of obtaining the infrared absorbing effect by the near-infrared absorbing fine particle dispersion body, the content of the near-infrared absorbing fine particles per unit projected area contained in the near-infrared absorbing fine particle dispersion body is preferably 0.04 g/m$^2$ or more and 10.0 g/m$^2$ or less. Note that the "content per unit projected area" means a weight (g) of the near-infrared absorbing fine particles contained in a thickness direction per unit area (m$^2$) through which light passes, in the near-infrared absorbing fine particle dispersion body of this embodiment.

The near-infrared absorbing fine particle dispersion body can be molded into an arbitrary shape according to the application. The near-infrared absorbing fine particle dispersion body can have, for example, a sheet shape, a board shape or a film shape, and can be applied to various uses.

Here, a method for producing the near-infrared absorbing fine particle dispersion body of this embodiment will be described.

The near-infrared absorbing fine particle dispersion body can be produced, for example, by mixing the above-described binder and the near-infrared absorbing fine particles of this embodiment, forming into a desired shape, and then curing.

Further, the near-infrared absorbing fine particle dispersion body can also be produced, for example, by using the above-described near-infrared absorbing dispersion liquid. In this case, a near-infrared absorbing fine particle dispersion powder, a plasticizer dispersion liquid and a master batch described below are produced first, then the near-infrared absorbing fine particle dispersion body can be produced using the near-infrared absorbing fine particle dispersion powder or the like. Specific explanation will be given hereafter.

First, a mixing step of mixing the above-described near-infrared absorbing fine particle dispersion liquid, thermoplastic resin or plasticizer can be performed. Subsequently, a drying step of removing a solvent component derived from the near-infrared absorbing fine particle dispersion liquid can be performed. By removing the solvent component, it is possible to obtain the near-infrared absorbing fine particle dispersion powder which is a dispersion body in which the near-infrared absorbing fine particles are dispersed at high concentration in thermoplastic resin and/or a dispersant derived from near-infrared absorbing fine particle dispersion liquid (sometimes simply referred to as "dispersion powder" hereafter), or a dispersion liquid in which the near-infrared absorbing fine particles are dispersed in the plasticizer at high concentration (sometimes simply referred to as "plasticizer dispersion liquid" hereafter).

There is no particular limitation in a method for removing the solvent component from the mixture of the near-infrared absorbing fine particle dispersion liquid and the thermoplastic resin or the like. However, for example, it is preferable to use a method for drying the mixture of the near-infrared absorbing fine particle dispersion liquid and the thermoplastic resin or the like under reduced pressure. Specifically, the mixture of the near-infrared absorbing fine particle dispersion liquid and the thermoplastic resin or the like is dried under reduced pressure while stirring, and the dispersion powder or the plasticizer dispersion liquid is separated from the solvent component. A vacuum stirring type dryer can be used as a device used for the reduced pressure drying. However, there is no particular limitation as long as it is a device having the above-described function. Further, a pressure value at the time of depressurization in the drying step is not particularly limited and can be arbitrarily selected.

By using the reduced pressure drying method in removing the solvent component, it is possible to improve a removing efficiency of the solvent from the mixture of the near-infrared absorbing fine particle dispersion liquid and the thermoplastic resin or the like. Further, when the reduced pressure drying method is used, the near-infrared absorbing fine particle dispersion powder and the plasticizer dispersion liquid are not exposed to a high temperature for a long time, and therefore aggregation of the near-infrared absorbing fine particles dispersed in the dispersion powder or the plasticizer dispersion liquid does not occur, which is preferable. Further, productivity of the near-infrared absorbing fine particle dispersion powder and the plasticizer dispersion liquid is increased, and it is easy to recover an evaporated solvent, which is preferable from a viewpoint of environmental consideration.

The remaining solvent is preferably 5 mass % or less in the near-infrared absorbing fine particle dispersion powder and the plasticizer dispersion liquid obtained after the above-described drying step. This is because when the remaining solvent is 5 mass % or less by using the near-infrared absorbing fine particle dispersion powder and the plasticizer dispersion liquid, for example, no air bubbles are generated at the time of producing a near-infrared absorbing laminated transparent substrate described later, and good appearance and optical properties are maintained.

Further, as described above, a master batch can also be used for producing the near-infrared absorbing fine particle dispersion body. The master batch can be produced, for example, by dispersing the near-infrared absorbing fine particle dispersion liquid and the near-infrared absorbing fine particle dispersion powder in the resin, and by pelletizing the resin.

As another method for producing the master batch, first, the near-infrared absorbing fine particle dispersion liquid or the near-infrared absorbing fine particle dispersion powder, particulates or pellets of thermoplastic resin, and other additives as necessary are uniformly mixed. Then, the mixture is kneaded in a vent type single-screw or twin-screw extruder, and the material is processed into pellets by a method for cutting common melt-extruded strands. In this case, there is a cylindrical or prismatic shape as a shape thereof. Further, it is also possible to adopt a so-called hot cut method in which the melt extrudate is directly cut. In this case, it is common to take a spherical shape.

By the above-described procedure, the near-infrared absorbing fine particle dispersion powder, the plasticizer dispersion liquid, and the master batch can be produced.

Then, the near-infrared absorbing fine particle dispersion body of this embodiment can be produced by uniformly mixing the near-infrared absorbing fine particle dispersion powder, the plasticizer dispersion liquid, or the master batch into the solid medium and molding it into a desired shape. At this time, as the solid medium, an inorganic binder or an organic binder such as a resin can be used as described above. A thermoplastic resin or a UV curable resin can be preferably used as the binder. Since the thermoplastic resin and the UV curable resin which can be particularly preferably used have already been described above, the description thereof is omitted here.

When a thermoplastic resin is used as the solid medium, the near-infrared absorbing fine particle dispersion powder, the plasticizer dispersion liquid or the master batch, the thermoplastic resin and, if desired, the plasticizer and other additives can be kneaded first. Then, from the kneaded material, for example, a sheet-shaped near-infrared light absorbing fine particle dispersion body molded into a flat or curved surface can be produced by various molding methods such as extrusion molding method, injection molding method, calender roll method, extrusion method, casting method, inflation method, or the like.

Note that in a case that the near-infrared absorbing fine particle dispersion body with a thermoplastic resin used as a solid medium, is used as an intermediate layer disposed between, for example, transparent substrates or the like, and in a case that the thermoplastic resin contained in the near-infrared absorbing fine particle dispersion body does not have sufficient flexibility and adhesion to a transparent substrate or the like, the plasticizer can be added when the near-infrared absorbing fine particle dispersion body is produced. Specifically, when the thermoplastic resin is a polyvinyl acetal resin, it is preferable to further add the plasticizer.

The plasticizer to be added is not particularly limited, and any substance can be used, which can function as the plasticizer for the thermoplastic resin to be used. For example, when a polyvinyl acetal resin is used as the thermoplastic resin, plasticizer which is a compound of monohydric alcohol and organic acid ester, ester type plasticizer such as polyhydric alcohol organic acid ester compound, phosphoric plasticizer such as organophosphate plasticizer, or the like can be preferably used as the plasticizer. Since it is preferable that the plasticizer is in a liquid state at room temperature, an ester compound synthesized from a polyhydric alcohol and a fatty acid is preferable.

Then, as described above, the near-infrared absorbing fine particle dispersion body of this embodiment can have an arbitrary shape, and can have a sheet shape, a board shape or a film shape.

By using the near-infrared absorbing fine particle dispersion body having the sheet shape, the board shape or the film shape, for example, a near-infrared absorbing laminated transparent substrate described later can be produced.

In the produced near-infrared absorbing fine particle dispersion body, an average value of the transmittance in the wavelength range of 800 to 900 nm is 13% or more and 42% or less when the visible light transmittance is 70%, and an average value of the transmittance in the wavelength range of 1200 to 1500 nm is 8% or less, and the transmittance at the wavelength of 2100 nm is 5% or less.

Here, it is easy to adjust the visible light transmittance to 70%, by adjusting the concentrations of the near-infrared absorbing fine particles contained in the above-described dispersion liquid, dispersion powder, plasticizer dispersion liquid or master batch, addition amounts of the near-infrared absorbing fine particles, dispersion powder, plasticizer dispersion liquid or master batch when preparing a resin composition, and film thickness of the film or sheet, etc.

[g] Near-Infrared Absorbing Laminated Transparent Substrate and Method for Producing the Same Next, one configuration example of the near-infrared absorbing laminated transparent substrate of this embodiment and a method for producing the same will be described.

The near-infrared absorbing laminated transparent substrate of this embodiment, can have a plurality of transparent substrates and the near-infrared absorbing fine particle dispersion body of this embodiment. Then, the near-infrared absorbing fine particle dispersion body can have a configuration of being disposed between a plurality of transparent substrates.

The near-infrared absorbing laminated transparent substrate of this embodiment can have a configuration in which the near-infrared absorbing fine particle dispersion body which is an intermediate layer is sandwiched from both sides thereof, by transparent substrates.

The transparent substrate is not particularly limited, and can be arbitrarily selected in consideration of the visible light transmittance and the like. For example, as the transparent substrate, one or more selected from sheet glass, plate-like plastic, board-like plastic, film-like plastic and the like can be used. Note that the transparent substrate is preferably transparent in the visible light region.

When a plastic transparent substrate is used, a material of the plastic is not particularly limited, and it can be selected according to the application, and polycarbonate resin, acrylic resin, polyethylene terephthalate resin, PET resin, polyamide resin, vinyl chloride resin, olefin resin, epoxy resin, polyimide resin, fluororesin, etc., can be used.

Note that two or more transparent substrates can be used for the near-infrared absorbing laminated transparent substrate of this embodiment. When two or more transparent substrates are used, for example, a transparent substrate made of different materials may be used in combination as the transparent substrate. Further, it is not necessary that a thickness of the transparent substrate is the same, it is also possible to combine transparent substrates having different thicknesses.

In the near-infrared absorbing laminated transparent substrate of this embodiment, the near-infrared absorbing fine particle dispersion body described in this embodiment can be used as an intermediate layer. Since the near-infrared absorbing fine particle dispersion body has already been described, its explanation will be omitted here.

The near-infrared absorbing fine particle dispersion body to be used for the near-infrared absorbing transparent substrate of this embodiment is not particularly limited. However, the near-infrared absorbing fine particle dispersion body molded into a sheet shape, a board shape or a film shape can be preferably used.

Then, the near-infrared absorbing laminated transparent substrate of this embodiment, can be produced by integrally laminating a plurality of transparent substrates which are faced each other, interposing the near-infrared absorbing fine particle dispersion body which is molded into a sheet shape or the like.

Further, the optical properties of the near-infrared absorbing laminated transparent substrate of the present invention are as follows: when the visible light transmittance is 70%, the average value of the transmittance in the wavelength range of 800 to 900 nm is 12% or more and 40% or less, and the average value of the transmittance in the wavelength range of 1200 to 1500 nm is 8% or less, and the transmittance at the wavelength of 2100 nm is 3.0% or less.

Here, it is easy to adjust the visible light transmittance to 70%, by adjusting the concentrations of the near-infrared absorbing fine particles contained in the above-described dispersion liquid, dispersion powder, plasticizer dispersion liquid or master batch, addition amounts of the near-infrared absorbing fine particles, dispersion powder, plasticizer dispersion liquid or master batch when preparing a resin composition, and film thickness of the film or sheet, etc.

It is known that a transmittance profile of the near-infrared absorbing fine particle dispersion body and the near-infrared absorbing transparent substrate of the present invention described above has the following features (1) to (3), compared to a transmission profile in a case of using the composite tungsten oxide fine particles of a conventional technique.

(1) In the transmittance profile of the near-infrared absorbing fine particles of the present invention, the region of the visible light transmission band spreads to the region of the wavelength of 800 to 900 nm which is the region of the near-infrared light, and a high transmittance is exhibited in this region.

(2) In the transmittance profile of the near-infrared absorbing fine particles the present invention, the average value of the transmittance in the wavelength range of 1200 to 1500 nm is hardly changed.

(3) The near-infrared light absorbing fine particles of the present invention have a near-infrared light absorbing performance at the wavelength of 2100 nm.

[h] Near-Infrared Absorbing Transparent Substrate and Method for Producing the Same It is possible to manufacture a near-infrared absorbing film or a near-infrared absorbing glass which is a near-infrared absorbing transparent substrate, by forming a coating layer containing near-infrared absorbing fine particles as a near-infrared absorbing fine particle dispersion body on a substrate film or on a transparent substrate selected from a substrate glass, using the above-described near-infrared absorbing fine particle dispersion liquid.

A near-infrared absorbing film or a near-infrared absorbing glass can be produced by mixing the above-described near-infrared absorbing fine particle dispersion liquid with plastic or monomer to prepare a coating liquid, and forming a coating layer on a transparent substrate by a known method.

For example, the near-infrared absorbing film can be prepared as follows.

A medium resin such as a solid medium after curing is added to the above-described near-infrared absorbing fine particle dispersion liquid to obtain a coating liquid. Then, it is possible to form a coating layer in which the near-infrared absorbing fine particles are dispersed in a medium by coating the surface of the film substrate with the coating liquid, and then evaporating a liquid medium and curing the resin by a predetermined method.

As a medium resin of the coating layer, for example, UV curable resin, thermosetting resin, electron beam curable resin, room temperature curable resin, thermoplastic resin, etc., can be selected according to the purpose. Specifically, polyethylene resin, polyvinyl chloride resin, polyvinylidene chloride resin, polyvinyl alcohol resin, polystyrene resin, polypropylene resin, ethylene vinyl acetate copolymer, polyester resin, polyethylene terephthalate resin, fluorine resin, polycarbonate resin, acrylic resin, and polyvinyl butyral resin can be selected.

These resins may be used alone or in combination. However, among the media for the coating layer, it is particularly preferable to use the UV curable resin binder from a viewpoint of productivity and equipment cost.

Further, it is also possible to use a binder using a metal alkoxide. As the metal alkoxide, alkoxides such as Si, Ti, Al, Zr and the like are representative. By using the binder containing these metal alkoxides, a coating layer composed of an oxide film can be formed by performing hydrolysis/polycondensation under heating or the like.

Note that as the material of the above-described film substrate, PET, acrylic, urethane, polycarbonate, polyethylene, ethylene vinyl acetate copolymer, vinyl chloride, fluorine resin and the like can be used according to various purposes. As the near-infrared absorbing film, a polyester film is preferable, and a PET film is more preferable.

Further, the surface of the film substrate is preferably subjected to a surface treatment in order to realize easy adhesion of the coating layer. In addition, it is also preferable to form an intermediate layer on the glass substrate or the film substrate, and form the coating layer on the intermediate layer in order to improve the adhesion between the glass substrate or the film substrate and the coating layer. The configuration of the intermediate layer is not particularly limited, and it can be configured for example, by a polymer film, a metal layer, an inorganic layer (for example, an inorganic oxide layer of silica, titania, zirconia or the like), an organic/inorganic composite layer, or the like.

A method for providing the coating layer on the substrate film or the substrate glass may be any method as long as the surface of the substrate can be uniformly coated with the near-infrared absorbing fine particle dispersion liquid, and is not particularly limited. For example, a bar coating method, a gravure coating method, a spray coating method, a dip coating method and the like can be used.

For example, according to the bar coating method using the UV curable resin, by using a coating liquid prepared by appropriately adjusting the liquid concentration and additives so as to have appropriate leveling properties, and by using a wire bar of a bar number which can satisfy the purpose of a thickness of the coating layer and a content of the near-infrared absorbing fine particles, a coating layer can be formed on the substrate film or the substrate glass. Then, by removing the organic solvent contained in the coating liquid by drying, and then curing under irradiation of ultraviolet rays, a coating layer can be formed on the substrate film or the substrate glass. At this time, drying conditions for the coating layer are different depending on each component, a solvent type and a usage ratio, but are usually about 20 seconds to 10 minutes at a temperature of 60° C. to 140° C. Ultraviolet irradiation is not particularly limited, and a UV exposure machine such as an extra-high pressure mercury lamp can be suitably used, for example.

In addition, adhesion between the substrate and the coating layer, smoothness of the coating layer at the time of coating, drying property of the organic solvent, and the like can be adjusted in a pre-step or a post-step of forming the coating layer. As the pre-step, for example, a substrate surface treatment step, a prebake (preheating of the substrate) step, and the like can be selected, and as the post-step, a post baking (post-heating of substrate) step and the like can be selected, and these steps can be selected appropriately. A heating temperature in the pre-baking step and/or the post-baking step is preferably 80° C. to 200° C., and a heating time is preferably 30 seconds to 240 seconds.

The thickness of the coating layer on the substrate film or on the substrate glass is not particularly limited, but in practice it is preferably 10 µm or less, more preferably 6 µm or less. This is because if the thickness of the coating layer is 10 µm or less, the substrate film has sufficient pencil hardness and abrasion resistance, and in addition, occurrence of process abnormality such as occurrence of warping of the substrate film can be avoided during volatilization of the solvent in the coating layer and curing of the binder.

The content of the near-infrared absorbing fine particles contained in the coating layer is not particularly limited, but the content per projection area of the film/glass/coating layer is preferably 0.1 $g/m^2$ or more and 10.0 $g/m^2$ or less. This is because when the content is 0.1 $g/m^2$ or more, the near-infrared absorption property can be exhibited significantly as compared with a case that the near-infrared absorbing fine particles are not contained, and when the content is 10.0 $g/m^2$ or less, the near-infrared absorbing film/glass/coating layer keeps sufficient visible light transmittance.

The optical properties of the near-infrared absorbing film and the near-infrared absorbing glass, which are produced near-infrared absorbing transparent substrates are as follows: when the visible light transmittance is 70%, the average value of the transmittance in the wavelength range of 800 to 900 nm is 12% or more and 40% or less, and the average value of the transmittance existing in the wavelength range of 1200 to 1500 nm is 8% or less, and the transmittance at the wavelength of 2100 nm is 3% or less. Note that adjusting the visible light transmittance to 70% is easily achieved. by adjusting the concentration of the near-infrared absorbing fine particles in the coating liquid or by adjusting the film thickness of the coating layer.

Further, in order to further impart an ultraviolet ray absorbing function to the near-infrared absorbing film or the near-infrared absorbing glass which is the near-infrared absorbing transparent substrate of the present invention, at least one or more of particles of inorganic-based titanium oxide, zinc oxide, cerium oxide or the like, organic-based benzophenone, benzotriazole, or the like may be added.

EXAMPLES

Hereinafter, the present invention will be described more specifically with reference to examples. However, the present invention is not limited to the following examples.

First, as a method for evaluating samples in the examples and comparative examples, explanation will be given for (1) Average dispersed particle size, (2) Spectral transmittance and visible light transmittance, and (3) c-axis lattice constant.

(1) Average Dispersed Particle Size

In the following examples and comparative examples, the average dispersed particle size of the near-infrared absorbing fine particles in the near-infrared absorbing fine particle dispersion liquid was 50% volume cumulative particle size, and was measured with a Microtrack (registered trademark) particle size distribution meter (manufactured by Nikkiso Co., Ltd.) which is a particle size distribution meter utilizing laser diffraction.

(2) Spectral Transmittance and Visible Light Transmittance

In the following examples and comparative examples, the transmittance of the near-infrared absorbing fine particle dispersion liquid for light having a wavelength of 320 to 2200 mu was measured using a spectrophotometer U-4100 manufactured by Hitachi, Ltd., while holding the dispersion liquid in a cell for spectrophotometer (model number: S10-SQ-1, material: synthetic quartz, optical path length: 1 mm, manufactured by GL Sciences Inc.).

During this measurement, the transmittance was measured in a state that the solvent of the dispersion liquid (methyl isobutyl ketone, etc., hereinafter abbreviated as MIBK) was filled in the above cell, and the baseline of the transmittance measurement was determined. As a result, in the spectral transmittance and the visible light transmittance, which will be described below, a light reflection on the cell surface for spectrophotometer and a contribution due to light absorption of the solvent are excluded and only light absorption by the near-infrared absorbing fine particles is calculated.

Further, the transmittance of the near-infrared absorbing transparent substrate for a light having a wavelength of 320 to 2200 nm was also measured using a spectrophotometer U-4100 manufactured by Hitachi, Ltd.

The visible light transmittance was calculated based on HS R 3106, from the transmittance of a light having a wavelength of 380 to 780 nm.

(3) c-Axis Lattice Constant

An X-ray diffraction pattern of the near-infrared absorbing fine particles was measured by a powder X-ray diffraction method (θ–2θ method) using a powder X-ray diffractometer (X'Pert-PRO/MPD manufactured by Spectris Co., Ltd. PANalytical). Then, c-axis lattice constant was calculated from the obtained X-ray diffraction pattern using the Rietveld method.

Example 1

Each powder of tungstic acid ($H_2WO_4$) and cesium hydroxide (CsOH) was weighed at a ratio equivalent to Cs/W (molar ratio)=0.33/1.00 and thoroughly mixed in an agate mortar to obtain mixed powder. The mixed powder was heated under supply of 0.6 vol % $H_2$ gas using $N_2$ gas as a carrier and subjected to reduction treatment at 550° C. for 3 hours, and then fired at 800° C. for 1 hour in an $N_2$ gas atmosphere to obtain cesium tungsten bronze powder having a hexagonal crystal structure (hereinafter abbreviated as "powder A"). The preparation conditions are shown in Table 1.

Further, 20 mass % of powder A, 8 mass % of an acrylic polymer dispersant having a group containing amine as a functional group, (amine value: 48 mg KOH/g, acrylic dispersant having a decomposition temperature of 250° C., hereinafter abbreviated as "dispersant a"), and 72 mass % of MIBK as a liquid medium were weighed. They were loaded in a paint shaker containing 0.3 mmφ $ZrO_2$ beads and pulverized and dispersed for 10 hours to obtain a near-infrared absorbing fine particle dispersion liquid (hereinafter referred to as "dispersion liquid A"). Here, the average dispersed particle size of the near-infrared absorbing fine particles in the dispersion liquid A was measured, and found to be 25 nm. Further, when the obtained near-infrared absorbing fine particle dispersion liquid was applied onto a single crystal silicon substrate whose crystal planes are aligned in a direction in which no X-ray diffraction peak was detected, and the X-ray diffraction pattern of the sample after removal of MIBK was measured to calculate the c-axis lattice constant, and found to be 7,6095 Å.

Further, 20 mass % of antimony-doped tin oxide powder, 6 mass % of polymer dispersant having a carboxyl group as a functional group, and 74 mass % of MIBK were weighed. They were loaded in a paint shaker containing 0.3 mmφ $ZrO_2$ beads, and a mixture was pulverized and dispersed for 5 hours to obtain a near-infrared absorbing fine particle dispersion liquid (hereinafter abbreviated as "dispersion liquid B"). Here, the average dispersed particle size of the near-infrared absorbing fine particles in the dispersion liquid B was measured and found to be 10 nm.

The dispersion liquid A and the dispersion liquid B were mixed, and a near-infrared absorbing fine particle dispersion liquid (hereinafter referred to as "dispersion liquid C") of Example 1 was prepared, in which a mixing ratio (weight ratio) of cesium tungsten bronze fine particles (composite tungsten oxide fine particles) and antimony doped tin oxide fine particles was adjusted so that cesium tungsten bronze fine particles/antimony doped tin oxide fine particles=80/20. The mixing ratio is shown in Table 1.

The obtained dispersion liquid C was appropriately diluted with MIBK and placed in a cell for spectrophotometer, and the spectral transmittance was measured. The average transmittance in the wavelength range of 800 to 900 nm was 46.3%, the average transmittance in wavelength range of 1200 to 1500 nm was 10.7%, and the transmittance at the wavelength of 2100 am was 10.0, in a transmittance profile when measurement was performed, with the dilution ratio adjusted so that the visible light transmittance was 85%. From this fact, it was confirmed that the visible light transmission band was clearly widened and the near-infrared absorbing performance at the wavelength of 2100 am was improved, compared with cesium tungsten bronze prepared by a conventional method shown in Comparative Example 1 below. The measurement results of the transmittance are shown in Table 1 and FIG. 1.

50 parts by weight of ARONIX UV-3701 (hereinafter referred to as UV-3701) produced by Toagosei Co., Ltd., which was an ultraviolet curable resin for hard coating, was mixed into 100 parts by weight of the dispersion liquid C, to obtain a near-infrared absorbing fine particle coating liquid (hereinafter referred to as a coating liquid C), and the coating liquid was applied onto a PET film (produced by Teijin, HPE-50) using a bar coater to form a coating lauer. Note that the same PET film was used in other examples and comparative examples.

A PET film provided with the coating layer was dried at 80° C. for 60 seconds to evaporate the solvent, and thereafter cured using a high pressure mercury lamp to prepare a near-infrared absorbing film provided with a coating layer containing the near-infrared absorbing fine particles. Note that the near-infrared absorbing film is an example of the near-infrared absorbing transparent substrate of the present invention.

In the preparation of the near-infrared absorbing film described above, the visible light transmittance was set to 70% by adjusting the concentration of the near-infrared absorbing particles in the coating liquid and the thickness of the coating layer.

When the optical properties of this near-infrared absorbing film were measured, the average value of the transmittance in the wavelength range of 800 to 900 nm was 28.6%, the average value of the transmittance in the wavelength range of 1200 to 1500 nm was 3.3%, the transmittance at the wavelength of 2100 nm was 2.8%, and the haze was 0.9% in the transmittance profile. The results are shown in Table 2.

Further, the coating liquid C was applied onto an inorganic clear glass of 10 cm×10 cm×2 mm with a bar coater to form a coating layer. The coating layer was dried at 80° C. for 60 seconds to evaporate the solvent, and thereafter cured using a high pressure mercury lamp, to thereby prepare a near-infrared absorbing glass having a coating layer containing near-infrared light absorbing fine particles formed thereon. Note that the near-infrared absorbing glass is an example of the near-infrared absorbing transparent substrate of the present invention.

In the preparation of the near-infrared absorbing glass described above, the visible light transmittance was set to 70% by adjusting the concentration of the near-infrared absorbing fine particles of the coating liquid or the thickness of the coating layer.

When the optical properties of this near-infrared absorbing glass were measured, the average value of the transmittance in the wavelength range of 800 to 900 nm was 24.9%, the average value of the transmittance in the wavelength range of 1200 to 1500 nm was 2.5%, the transmittance at the wavelength of 2100 nm was 2.2%, and the haze was 0.4% in the transmittance profile. The results are shown in Table 2.

Further, dispersant a was further added to the dispersion liquid C so that a mass ratio between dispersant a and the near-infrared absorbing fine particles was [dispersant a/composite tungsten oxide fine particles]=3. Next, methyl isobutyl ketone was removed from the prepared dispersion using a spray drier to obtain composite tungsten oxide fine particle dispersion powder (hereinafter referred to as dispersion powder).

A predetermined amount of dispersion powder was added to a polycarbonate resin which was a thermoplastic resin so that the visible light transmittance of a produced near-infrared absorbing sheet (1.0 mm thick) was 70%, to prepare a composition for producing the near-infrared absorbing sheet.

The composition for producing the near-infrared absorbing sheet was kneaded at 280° C. using a twin screw extruder, extruded from a T die, and formed into a sheet material having a thickness of 1.0 mm by a calendar roll method, thereby obtaining a near-infrared absorbing sheet of Example 1. Note that the near-infrared absorbing sheet is an example of the near-infrared absorbing fine particle dispersion body of the present invention.

When the optical properties of the obtained near-infrared absorbing sheet of Example 1 were measured, it was found that the visible light transmittance was 70%, the average value of the transmittance in the wavelength range of 800 to 900 nm was 22.7%, the average value of the transmittance in the wavelength range of 1200 to 1500 nm was 1.5%, the transmittance at a wavelength of 2100 nm was 0.9%, and the haze was 0.5%. The evaluation results are shown in Table 3.

Further, triethylene glycol-di-2-ethyl butyrate was added as a plasticizer to the obtained dispersion liquid C, to prepare a mixed solution. Then, the obtained mixed solution was loaded into a stirring vacuum dryer. Next, the MIBK was removed by drying under reduced pressure at room temperature using a stirring vacuum dryer to obtain a plasticizer dispersion liquid.

Next, the plasticizer dispersion liquid was added to polyvinyl butyral. At this time, the concentration of the near-infrared absorbing fine particles was adjusted so that the visible light transmittance was 70.0 to 70.5% when it was used as a laminated transparent substrate, to prepare a composition for producing a near-infrared absorbing transparent substrate. The obtained composition for producing the near-infrared absorbing laminated transparent substrate was kneaded at a temperature of 200° C. using a twin-screw extruder, then extruded from T die, to obtain an intermediate film for producing the near-infrared absorbing laminated transparent substrate of Example 1, as an 0.7 mm thick sheet by a calendar roll method. The intermediate film for producing the obtained near-infrared absorbing laminated transparent substrate was sandwiched between two clear glass substrates of 100 mm×100 mm×about 3 mm thick, and temporary bonding was carried out by heating at 80° C., and thereafter main bonding was carried out at 140° C. using an autoclave of 14 kg/cm$^2$, to prepare the infrared-absorbing transparent substrate of Example 1. When the content of near-infrared absorbing fine particles in the transparent substrate obtained at this time was estimated from the composition for producing the near-infrared absorbing laminated transparent substrate to be used, the content of the near-infrared absorbing fine particles per 1 m$^2$ of the transparent substrate was 2.30 g.

The spectral transmittance of the obtained near-infrared absorbing laminated transparent substrate was measured. The visible light transmittance was 70.2%, the average transmittance in the wavelength range of 800 to 900 nm was 24.8%, the average transmittance in the wavelength range of 1200 to 1500 nm was 2.9%, the transmittance at the wavelength of 2100 nm was 2.4%, and the haze was 1.0%. From this fact, it was confirmed that the visible light transmission band was clearly spreading compared with cesium tungsten bronze prepared by the conventional method shown in Comparative Example 1 below and a near-infrared absorption performance at the wavelength of 2100 nm was improved. The measurement results of the transmittance are shown in Table 3.

Examples 2 to 6

A near-infrared absorbing fine particle dispersion liquid, a near-infrared absorbing film, a near-infrared absorbing glass, a near-infrared absorbing sheet and a near-infrared absorbing laminated transparent substrate of Examples 2 to 6 were prepared, in the same manner as in Example 1, except that the Cs/W ratio, the H$_2$ gas volume ratio, the reduction temperature, the reduction time, the mixing ratio of cesium tungsten bronze and antimony-doped tin oxide fine particles at the time of preparing cesium tungsten bronze were changed as shown in Table 1. Evaluation was performed to the cesium tungsten bronze, the near-infrared absorbing fine particle dispersion liquid, the near-infrared absorbing film, the near-infrared absorbing glass, the near-infrared absorbing sheet, and the near-infrared absorbing laminated transparent substrate of Examples 2 to 6, in the same manner as in Example 1. The evaluation results are shown in Tables 1 to 3.

Example 7

16 mass % of the powder A obtained in Example 1, 4 mass % of tin-doped indium oxide powder, 8 mass % of dispersant a 72 mass % of MIBK were weighed.

They were loaded in a paint shaker containing 0.3 mmϕZrO$_2$ beads and pulverized and dispersed for 10 hours to obtain a near-infrared absorbing fine particle dispersion liquid.

Thereafter, a near-infrared light absorbing fine particle dispersion liquid, a near-infrared absorbing film, a near-infrared absorbing glass, a near-infrared absorbing sheet, and a near-infrared absorbing laminated transparent substrate of Example 7 were obtained, in the same manner as in Example 1, Evaluation results are shown in Tables 1 to 3 and FIG. 1.

Example 8

10 mass % of the powder A obtained in Example 1, 10 mass % of tin-doped indium oxide powder, 8 mass % of dispersant a and 72 mass % of MIBK were weighed.

They were loaded in a paint shaker containing 0.3 mmϕ$ZrO_2$ beads and pulverized and dispersed for 10 hours to obtain a near-infrared absorbing fine particle dispersion liquid.

Thereafter, a near-infrared light absorbing fine particle dispersion liquid, a near-infrared absorbing film, a near-infrared absorbing glass, a near-infrared absorbing sheet, and a near-infrared absorbing laminated transparent substrate of Example 8 were obtained, in the same manner as in Example 1. Evaluation results are shown in Tables 1 to 3.

Comparative Example 1

Cesium tungsten bronze, a near-infrared absorbing fine particle dispersion liquid, a near-infrared absorbing glass, a near-infrared absorbing film, a near-infrared absorbing sheet, a near-infrared absorbing laminated transparent substrate were obtained in the same manner as in Example 1 except that each powder of tungstic acid ($H_2WO_4$) and cesium hydroxide ($C_sOH$) was mixed at a ratio equivalent to Cs/W (molar ratio)=0.33/1.00, heated under supply of 5% $H_2$ gas using $N_2$ gas as a carrier, subjected to reduction treatment at 550° C. for 1 hour, and thereafter baking was performed at 800° C. for 1 hour under $N_2$ gas atmosphere and dispersion liquid B was not mixed. Evaluation was performed to the cesium tungsten bronze, the near-infrared absorbing fine particle dispersion liquid, the near-infrared absorbing glass, the near-infrared absorbing film, the near-infrared absorbing sheet, and the near-infrared absorbing laminated transparent substrate of Comparative Example 1, in the same manner as in Example 1. The evaluation results are shown in Tables 1 to 3.

When the spectral transmittance was measured at the time of adjusting a dilution ratio so that the visible light transmittance of the obtained near-infrared absorbing fine particle dispersion liquid was 85%, the average value of the transmittance in the wavelength range of 800 to 900 nm was 26.0%, the average value of the transmittance in the wavelength range of 1200 to 1500 nm was 13.3%, and the transmittance at the wavelength of 2100 nm was 24.4% in the transmittance profile. The measurement results of the transmittance are shown in Table 2 and FIG. 1.

Further, when the spectral transmittance of the obtained near-infrared absorbing laminated transparent substrate was measured, the visible light transmittance was 70.1%, the average value of the transmittance in the wavelength range of 800 to 900 nm was 10.7%, the average value of the transmittance in the wavelength range of wavelength of 1200 to 1500 nm was 3.9%, the transmittance at the wavelength of 2100 nm was 8.4%, and the haze was 0.9%.

Further, when the content of the near-infrared absorbing fine particles per 1 $m^2$ of the transparent substrate was estimated, it was 1.32 g.

As described above, it was confirmed that the average value of the transmittance in the wavelength range of 800 to 900 nm was lower, and the average value of the transmittance at the wavelength of 2100 nm was higher than in Examples 1 to 9.

Evaluation of Examples 1 to 8 and Comparative Example 1

In the near-infrared absorbing fine particle dispersion liquid of Examples 1 to 8, the average value of the transmittance of the near-infrared light in the wavelength range of 800 to 900 nm was higher, the transmittance in the wavelength range of 1200 to 1500 nm and at the wavelength of 2100 nm was lower, than in Comparative Example 1 in which conventional composite tungsten oxide fine particles were used.

As a result, it was found that according to the near-infrared absorbing film, the near-infrared absorbing glass, the near-infrared absorbing sheet, the near-infrared absorbing laminated transparent substrate prepared using the dispersion liquid of Examples 1 to 8, a high transmittance of the near-infrared light was obtained in the wavelength range of 800 nm to 900 nm while ensuring a high heat shielding property exerted by the near-infrared absorbing fine particles, and a scorching sensation on the skin is reduced.

TABLE 1

| | CsWO production | | | | | | | | Mixing ratio of near-infrared absorbing fine particles | |
|---|---|---|---|---|---|---|---|---|---|---|
| | | Reduction treatment | | | | Heat treatment | | | | |
| | Cs/W [Atomic ratio] | Carrier gas | $H_2$ gas [Volume %] | Temperature [° C.] | Time [h] | Carrier gas | Temperature [° C.] | Time [h] | CsWO/ATO [Weight ratio] | CsWO/ATO [Weight ratio] |
| Example 1 | 0.33 | $H_2/N_2$ | 0.6 | 550 | 3 | $N_2$ | 800 | 1 | 80/20 | — |
| Example 2 | 0.33 | $H_2/N_2$ | 0.6 | 550 | 3 | $N_2$ | 800 | 1 | 50/50 | — |
| Example 3 | 0.33 | $H_2/N_2$ | 0.6 | 550 | 3 | $N_2$ | 800 | 1 | 25/75 | — |
| Example 4 | 0.33 | $H_2/N_2$ | 1 | 480 | 6 | $N_2$ | 800 | 1 | 80/20 | — |
| Example 5 | 0.33 | $H_2/N_2$ | 1 | 480 | 6 | $N_2$ | 800 | 1 | 60/40 | — |
| Example 6 | 0.33 | $H_2/N_2$ | 1 | 480 | 6 | $N_2$ | 800 | 1 | 40/60 | — |
| Example 7 | 0.33 | $H_2/N_2$ | 0.6 | 550 | 3 | $N_2$ | 800 | 1 | — | 80/20 |
| Example 8 | 0.33 | $H_2/N_2$ | 0.6 | 550 | 3 | $N_2$ | 800 | 1 | — | 50/50 |
| Comparative example 1 | 0.33 | $H_2/N_2$ | 5 | 550 | 1 | $N_2$ | 800 | 1 | 100/0 | |

| | Near-infrared absorbing fine particle dispersion liquid | | | | | |
|---|---|---|---|---|---|---|
| | Average dispersed particle size [nm] | Lattice constant c-axis [Å] | Transmittance | | | |
| | | | Visible light [%] | 800~900 nm* [%] | 1200~1500 nm* [%] | 2100 nm [%] |
| Example 1 | 25 | 7.6095 | 85.0 | 46.3 | 10.7 | 10.0 |
| Example 2 | 25 | 7.6095 | 85.0 | 51.8 | 13.8 | 6.1 |
| Example 3 | 25 | 7.6095 | 85.0 | 59.3 | 18.5 | 3.4 |

TABLE 1-continued

|   | | | | | | |
|---|---|---|---|---|---|---|
| Example 4 | 25 | 7.6073 | 85.0 | 53.1 | 11.9 | 8.3 |
| Example 5 | 25 | 7.6073 | 85.0 | 56.0 | 13.9 | 6.1 |
| Example 6 | 25 | 7.6073 | 85.0 | 59.9 | 16.7 | 4.2 |
| Example 7 | 25 | 7.6095 | 85.0 | 45.1 | 7.7 | 6.9 |
| Example 8 | 25 | 7.6095 | 85.0 | 48.6 | 5.4 | 1.6 |
| Comparative example 1 | 23 | 7.6190 | 85.0 | 26.0 | 13.3 | 24.4 |

CsWO: Cesium tungsten bronze
*Average transmittance in a wavelength range (arithmetic average)

TABLE 2

| | Near-infrared absorbing film | | | | | Near-infrared absorbing glass | | | | |
|---|---|---|---|---|---|---|---|---|---|---|
| | Transmittance | | | | | Transmittance | | | | |
| | Visible light [%] | 800~900 nm* [%] | 1200~1500 nm* [%] | 2100 nm [%] | Haze [%] | Visible light [%] | 800~900 nm* [%] | 1200~1500 nm* [%] | 2100 nm [%] | Haze [%] |
| Example 1 | 70.0 | 28.6 | 3.3 | 2.8 | 0.9 | 70.0 | 24.9 | 2.5 | 2.2 | 0.4 |
| Example 2 | 70.0 | 33.8 | 4.7 | 1.3 | 0.9 | 70.0 | 29.8 | 3.7 | 1.0 | 0.4 |
| Example 3 | 70.0 | 41.3 | 7.4 | 0.6 | 0.9 | 70.0 | 36.8 | 5.9 | 0.4 | 0.4 |
| Example 4 | 70.0 | 35.2 | 3.6 | 2.4 | 0.9 | 70.0 | 31.0 | 2.7 | 1.7 | 0.4 |
| Example 5 | 70.0 | 39.0 | 4.8 | 1.2 | 0.9 | 70.0 | 32.9 | 3.7 | 1.0 | 0.4 |
| Example 6 | 70.0 | 41.6 | 7.6 | 0.6 | 0.9 | 70.0 | 37.9 | 6.2 | 0.4 | 0.4 |
| Example 7 | 70.0 | 27.5 | 2.1 | 1.6 | 0.9 | 70.0 | 23.9 | 1.5 | 1.2 | 0.4 |
| Example 8 | 70.0 | 30.8 | 1.4 | 0.2 | 0.9 | 70.0 | 26.9 | 1.0 | 0.1 | 0.4 |
| Comparative example 1 | 70.0 | 12.1 | 4.4 | 10.6 | 0.9 | 70.0 | 10.0 | 3.4 | 9.2 | 0.4 |

*Average transmittance in a wavelength range (arithmetic average)

TABLE 3

| | Near-infrared absorbing sheet | | | | | Near-infrared absorbing laminated transparent substrate | | | | | |
|---|---|---|---|---|---|---|---|---|---|---|---|
| | Transmittance | | | | | Content of near-infrared absorbing fine particles per 1 m² of transparent substrate [g] | Transmittance | | | | |
| | Visible light [%] | 800~900 nm* [%] | 1200~1500 nm* [%] | 2100 nm [%] | Haze [%] | | Visible light [%] | 800~900 nm* [%] | 1200~1500 nm* [%] | 2100 nm [%] | Haze [%] |
| Example 1 | 70.0 | 22.7 | 1.5 | 0.9 | 0.5 | 2.30 | 70.2 | 24.8 | 2.9 | 2.4 | 1.0 |
| Example 2 | 70.0 | 27.9 | 2.4 | 0.4 | 0.5 | 2.76 | 70.1 | 29.0 | 4.1 | 1.1 | 0.9 |
| Example 3 | 70.0 | 35.9 | 4.2 | 0.1 | 0.5 | 3.20 | 70.5 | 35.8 | 6.7 | 0.6 | 0.9 |
| Example 4 | 70.0 | 29.1 | 1.7 | 0.7 | 0.5 | 2.50 | 70.5 | 30.7 | 3.6 | 2.0 | 1.0 |
| Example 5 | 70.0 | 31.9 | 2.3 | 0.3 | 0.5 | 2.84 | 70.0 | 32.3 | 4.1 | 1.1 | 0.9 |
| Example 6 | 70.0 | 36.9 | 4.4 | 0.2 | 0.5 | 3.15 | 70.0 | 35.5 | 5.4 | 0.7 | 0.9 |
| Example 7 | 70.0 | 21.6 | 0.9 | 0.5 | 0.5 | 2.83 | 70.3 | 23.6 | 1.8 | 1.3 | 0.9 |
| Example 8 | 70.0 | 24.9 | 0.6 | 0.0 | 0.5 | 3.31 | 70.2 | 26.6 | 1.2 | 0.2 | 0.9 |
| Comparative example 1 | 70.0 | 7.7 | 2.1 | 4.8 | 0.5 | 1.32 | 70.1 | 10.7 | 3.9 | 8.4 | 0.9 |

*Average transmittance in a wavelength range (arithmetic average)

The invention claimed is:

1. A near-infrared absorbing fine particle dispersion body comprising:
   a solid binder; and
   mixed particles of at least (i) composite tungsten oxide fine particles, and (ii) antimony-doped tin oxide fine particles and/or tin-doped indium oxide fine particles, the mixed particles being dispersed in the solid binder, wherein:
   the composite tungsten oxide fine particles have, when a visible light transmittance is 85% at the time of calculating only light absorption by the composite tungsten oxide fine particles:
   an average value of a transmittance in a wavelength range of 800 to 900 nm of 30% or more and 60% or less,
   an average value of a transmittance in a wavelength range of 1200 to 1500 nm of 20% or less, and a transmittance at a wavelength of 2100 nm of 22% or less, the composite tungsten oxide fine particles have a dispersed particle size of 25 nm or less, and a c-axis lattice constant of the composite tungsten oxide fine particles is 7.6073 Å or more and 7.6095 Å or less.

2. The near-infrared absorbing fine particle dispersion body according to claim 1, wherein the binder comprises at least a thermoplastic resin or a UV curable resin.

3. The near-infrared absorbing fine particle dispersion body according to claim 2, wherein the transparent thermoplastic resin is any one of:

one resin selected from a resin group consisting of polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene-vinyl acetate copolymer, and polyvinyl acetal resin, or a mixture of two or more resins selected from the above resin group, or a copolymer of two or more resins selected from the above resin group.

4. The near-infrared absorbing fine particle dispersion body according to claim 1, containing the near-infrared absorbing fine particles in an amount of 0.001 mass % or more and 80.0 mass % or less.

5. The near-infrared absorbing fine particle dispersion body according to claim 1, wherein the near-infrared absorbing fine particle dispersion body is formed in a sheet shape, a board shape, or a film shape.

6. The near-infrared absorbing fine particle dispersion body according to claim 1, wherein a content of the near-infrared absorbing fine particles per unit projected area contained in the near-infrared absorbing fine particle dispersion body is 0.04 g/m$^2$ or more and 10.0 g/m$^2$ or less.

7. The near-infrared absorbing fine particle dispersion body according to claim 1, having a transmittance profile in which, when a visible light transmittance is adjusted to 70%:

an average value of a transmittance in a wavelength range of 800 to 900 nm of 13% or more and 42% or less, an average value of a transmittance in a wavelength range of 1200 to 1500 nm of 8% or less, and a transmittance at a wavelength of 2100 nm of 5% or less.

8. A near-infrared absorbing transparent substrate, comprising the near-infrared absorbing fine particle dispersion body according to claim 1 formed on at least one surface of a transparent substrate which is a resin substrate or a glass substrate.

9. The near-infrared absorbing transparent substrate according to claim 8, wherein a thickness of the near-infrared absorbing fine particle dispersion body is 10 μm or less.

10. The near-infrared absorbing transparent substrate according to claim 8, wherein the transparent substrate is the resin substrate and the resin substrate is a polyester film.

11. The near-infrared absorbing transparent substrate according to claim 8 having a transmittance profile in which, when the substrate has a thickness of 1.0 mm and a visible light transmittance is adjusted to 70%:

an average value of a transmittance in a wavelength range of 800 to 900 nm is 12% or more and 40% or less, an average value of a transmittance in a wavelength range of 1200 to 1500 nm is 8% or less, and a transmittance at a wavelength of 2100 nm is 3.0% or less.

12. A near-infrared absorbing laminated transparent substrate, comprising the near-infrared absorbing fine particle dispersion body of claim 1 present between a plurality of transparent substrates.

13. The near-infrared absorbing laminated transparent substrate according to claim 12 having a transmittance profile in which, when the near-infrared absorbing fine particle dispersion body has a thickness of 0.7 mm and a visible light transmittance is adjusted to 70%:

an average value of a transmittance in a wavelength range of 800 to 900 nm is 12% or more and 40% or less, an average value of a transmittance in a wavelength range of 1200 to 1500 nm is 8% or less, and a transmittance at a wavelength of 2100 nm is 3.0% or less.

* * * * *